(12) United States Patent
Yoon et al.

(10) Patent No.: US 12,122,237 B2
(45) Date of Patent: Oct. 22, 2024

(54) VEHICLE DISPLAY APPARATUS

(71) Applicant: LG ELECTRONICS INC., Seoul (KR)

(72) Inventors: Jaegu Yoon, Seoul (KR); Daeyoung Jeong, Seoul (KR); Hyoungkyu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/288,231

(22) PCT Filed: Jan. 13, 2022

(86) PCT No.: PCT/KR2022/000626
§ 371 (c)(1),
(2) Date: Oct. 25, 2023

(87) PCT Pub. No.: WO2023/136376
PCT Pub. Date: Jul. 20, 2023

(65) Prior Publication Data
US 2024/0217342 A1    Jul. 4, 2024

(51) Int. Cl.
*B60K 35/85*  (2024.01)
*B60K 35/22*  (2024.01)

(52) U.S. Cl.
CPC .............. *B60K 35/85* (2024.01); *B60K 35/22* (2024.01); *B60K 2360/182* (2024.01); *B60K 2360/46* (2024.01); *B60K 2360/583* (2024.01)

(58) Field of Classification Search
CPC .... B60K 35/85; B60K 35/22; B60K 2360/46; B60K 2360/182; B60K 2360/583
(Continued)

(56) References Cited

U.S. PATENT DOCUMENTS

2002/0152371 A1* 10/2002 Lee .................. G06F 15/177
                                                    713/2
2007/0204113 A1    8/2007 Landry
(Continued)

FOREIGN PATENT DOCUMENTS

CN        107102898 B     4/2021
JP      2017-507401 A     3/2017
(Continued)

OTHER PUBLICATIONS

Supplementary European Search Report dated Jul. 17, 2024 for Application No. 22920709.7.

*Primary Examiner* — Matthew David Kim
(74) *Attorney, Agent, or Firm* — Birch, Stewart, Kolasch & Birch, LLP

(57) ABSTRACT

The present disclosure relates to a vehicle display apparatus. The vehicle display apparatus according to an embodiment of the present disclosure comprises: a first display and a second display mounted in a vehicle; a signal processing device configured to perform signal processing for at least one of the first display or the second display; and a second signal processing device configured to perform signal processing, wherein the signal processing device is configured to determine whether the second signal processing device is a master device or a slave device, based on number information of processors in the second signal processing device and information on support of non-uniform memory access. Accordingly, data exchange between the plurality of signal processing devices may be performed efficiently.

20 Claims, 22 Drawing Sheets

(58) Field of Classification Search
USPC .......................................................... 348/837
See application file for complete search history.

(56) References Cited

U.S. PATENT DOCUMENTS

| | | | | |
|---|---|---|---|---|
| 2009/0185215 | A1* | 7/2009 | Kreppold | G06F 12/0661 358/1.15 |
| 2009/0268743 | A1* | 10/2009 | Chang | G06F 13/4045 370/401 |
| 2012/0317364 | A1 | 12/2012 | Loh | |
| 2013/0031140 | A1* | 1/2013 | Ferringer | G06N 3/126 707/E17.127 |
| 2013/0254446 | A1* | 9/2013 | Han | G06F 11/1666 710/304 |
| 2014/0089540 | A1* | 3/2014 | Tsukada | G06F 3/0659 710/74 |
| 2014/0254594 | A1* | 9/2014 | Gasparakis | H04L 69/324 370/392 |
| 2014/0278695 | A1* | 9/2014 | Smith | G06Q 10/06313 705/7.23 |
| 2014/0281348 | A1 | 9/2014 | Nayar et al. | |
| 2014/0286338 | A1* | 9/2014 | Kurita | H04L 49/70 370/392 |
| 2015/0215379 | A1* | 7/2015 | Tamano | G06F 9/50 709/201 |
| 2018/0159801 | A1 | 6/2018 | Rajan et al. | |
| 2019/0020433 | A1* | 1/2019 | Pitigoi-Aron | H04W 56/001 |
| 2019/0042508 | A1 | 2/2019 | Raghav et al. | |
| 2019/0050240 | A1* | 2/2019 | Gan | G06F 9/445 |
| 2020/0394339 | A1 | 12/2020 | Mayer et al. | |
| 2022/0043576 | A1* | 2/2022 | Maezawa | G06F 3/0664 |

FOREIGN PATENT DOCUMENTS

| | | |
|---|---|---|
| JP | 6523298 B2 | 5/2019 |
| KR | 10-0690416 B1 | 3/2007 |
| KR | 10-2009-0118941 A | 11/2009 |
| KR | 10-2012-0073323 A | 7/2012 |
| KR | 10-2017-0025671 A | 3/2017 |
| KR | 10-2019-0070506 A | 6/2019 |

* cited by examiner

FIG. 8A

| RESOURCE TYPE | RESOURCE USAGE |
|---|---|
| CPU | 30kDMIPS |
| GPU | 8GFlops |
| NPU/DSP | 22TOPS |
| Security TEE | Supportable |
| Network 4G, 5G | Supportable |

FIG. 8B

| RESOURCE TYPE | SCORE |
|---|---|
| CPU | ... |
| GPU | ... |
| DSP | ... |
| Cloud | ... |

VEHICLE DISPLAY APPARATUS

CROSS REFERENCE TO RELATED APPLICATION

This application is the National Phase of PCT International Application No. PCT/KR2022/000626, filed on Jan. 13, 2022, which is hereby expressly incorporated by reference into the present application.

BACKGROUND

1. Field

The present disclosure relates to a vehicle display apparatus, and more particularly to a vehicle display apparatus capable of performing efficient data exchange between a plurality of signal processing devices.

2. Description of the Related Art

A vehicle is an apparatus that a driver moves in a desired direction. A representative example of the vehicle is a car.

Meanwhile, a display apparatus for vehicles is located in the vehicle for convenience of users who use the vehicle.

For example, a display is disposed in a cluster in order to display various kinds of information. Meanwhile, in order to display vehicle driving information, various displays, such as an audio video navigation (AVN) display and a rear seat entertainment display, are located in the vehicle, in addition to the cluster.

As the number of displays in the display apparatus for vehicles is increased, as described above, a plurality of signal processing devices for a plurality of displays is used.

Korean Patent Publication Application No. 2018-0083572 (hereinafter referred to as "prior art document") discloses an electronic apparatus including a plurality of connectors configured to allow a plurality of functional modules to be located thereto and a host device configured to request transmission of information from the plurality of functional modules located to the connectors, to determine suitability according to functions and priorities of the plurality of functional modules based on the information received from the plurality of functional modules, and to, when functional modules essentially required for a specific function are all located, perform control such that the functional module performs the specific function.

However, the prior art document has a problem in that data transmission efficiency is low, since the functional modules are connected to the host device 21 via a communication line 26 and are individually executed.

SUMMARY

It is an object of the present disclosure to provide a vehicle display apparatus capable of performing efficient data exchange between a plurality of signal processing devices.

Meanwhile, it is another object of the present disclosure to provide a vehicle display apparatus capable of performing efficient data exchange by using an appropriate data communication scheme depending on the type of signal processing device.

Meanwhile, it is further another object of the present disclosure to provide a vehicle display apparatus capable of performing efficient resource management or load distribution between a plurality of signal processing devices.

In accordance with an aspect of the present disclosure, the above and other objects can be accomplished by the provision of a vehicle display apparatus including: a first display and a second display mounted in a vehicle: a signal processing device configured to perform signal processing for at least one of the first display or the second display; and a second signal processing device configured to perform signal processing, wherein the signal processing device is configured to determine whether the second signal processing device is a master device or a slave device, based on number information of processors in the second signal processing device and information on support of non-uniform memory access.

Meanwhile, in response to the non-uniform memory access being supported while the processors in the second signal processing device are plural in number, the signal processing device may be configured to determine the second signal processing device to be a master device.

Meanwhile, the signal processing device may be configured to determine whether the second signal processing device is of a blade type or a high-speed backbone type, based on hot plugging information of a side-band signal from the second signal processing device.

Meanwhile, in response to the second signal processing device being of the blade type, the second signal processing device may be configured to receive data via a deserializer network.

Meanwhile, in response to the second signal processing device being the high-speed backbone type, the signal processing device may be configured to exchange data through Ethernet communication or high-speed PCI communication.

Meanwhile, in response to the non-uniform memory access not being supported while the processors in the second signal processing device are plural in number, the signal processing device may be configured to exchange data with the second signal processing device through interface communication, and to determine the second signal processing device to be a master device or a slave device based on the interface communication.

Meanwhile, in response to the non-uniform memory access not being supported while the processors in the second signal processing device are plural in number, the signal processing device may be configured to request resource information of the second signal processing device, to receive the resource information of the second signal processing device, and to determine the second signal processing device to be a master device or a slave device based on the received resource information of the second signal processing device.

Meanwhile, in response to the processors in the second signal processing device not being plural in number, the signal processing device may be configured to exchange data with the second signal processing device through interface communication, and to determine the second signal processing device to be a master device or a slave device based on the interface communication.

Meanwhile, in response to the processors in the second signal processing device not being plural in number, the signal processing device may be configured to exchange data through at least one of USB communication, Ethernet communication, or high-speed PCI communication.

Meanwhile, in response to the processors in the second signal processing device not being plural in number and the interface communication not being supported, the signal processing device may be configured to determine the second signal processing device to be a slave device.

Meanwhile, in response to a server virtual machine not being supported in the second signal processing device, the signal processing device may be configured to determine the second signal processing device to be a slave device.

Meanwhile, in response to a server virtual machine being executed in the second signal processing device and the non-uniform memory access being supported, the signal processing device may be configured to determine the second signal processing device to be a master device.

Meanwhile, in response to a server virtual machine being executed in the second signal processing device and the non-uniform memory access not being supported, the signal processing device may be configured to exchange data with the second signal processing device through interface communication, and to determine the second signal processing device to be a master device or a slave device based on the interface communication.

Meanwhile, in response to a server virtual machine being executed in the second signal processing device and the non-uniform memory access not being supported, the signal processing device may be configured to request resource information of the second signal processing device, to receive the resource information of the second signal processing device, and to determine the second signal processing device to be a master device or a slave device based on the received resource information of the second signal processing device.

Meanwhile, the resource information of the second signal processing device may be received via Scalable service-Oriented MiddlewarE over IP (SOME/IP) communication.

Meanwhile, the signal processing device may be configured to further receive extension information and type information of the second signal processing device via the SOME/IP communication.

In accordance with another aspect of the present disclosure, there is provided a vehicle display apparatus including: a first display and a second display mounted in a vehicle: a signal processing device configured to perform signal processing for at least one of the first display or the second display; and a second signal processing device configured to perform signal processing, wherein the signal processing device may be configured to determine whether the second signal processing device is a master device or a slave device, based on information as to whether a server virtual machine is executed in the second signal processing device and information on support of non-uniform memory access.

Effects of the Disclosure

A vehicle display apparatus according to an embodiment of the present disclosure includes: a first display and a second display mounted in a vehicle: a signal processing device configured to perform signal processing for at least one of the first display or the second display; and a second signal processing device configured to perform signal processing, wherein the signal processing device is configured to determine whether the second signal processing device is a master device or a slave device, based on number information of processors in the second signal processing device and information on support of non-uniform memory access. Accordingly, data exchange between the plurality of signal processing devices may be performed efficiently. Particularly, data exchange may be performed efficiently by using an appropriate data communication scheme depending on a type of the second signal processing device.

Meanwhile, in response to the non-uniform memory access being supported while the processors in the second signal processing device are plural in number, the signal processing device may be configured to determine the second signal processing device to be a master device. Accordingly, data exchange between the plurality of signal processing devices may be performed efficiently.

Meanwhile, the signal processing device may be configured to determine whether the second signal processing device is of a blade type or a high-speed backbone type, based on hot plugging information of a side-band signal from the second signal processing device. Accordingly, data exchange between the plurality of signal processing devices may be performed efficiently. Particularly, data exchange may be performed efficiently by using an appropriate data communication scheme depending on a type of the second signal processing device.

Meanwhile, in response to the second signal processing device being of the blade type, the second signal processing device may be configured to receive data via a deserializer network. Accordingly, data exchange between the plurality of signal processing devices may be performed efficiently.

Meanwhile, in response to the second signal processing device being the high-speed backbone type, the signal processing device may be configured to exchange data through Ethernet communication or high-speed PCI communication. Accordingly, data exchange between the plurality of signal processing devices may be performed efficiently.

Meanwhile, in response to the non-uniform memory access not being supported while the processors in the second signal processing device are plural in number, the signal processing device may be configured to exchange data with the second signal processing device through interface communication, and to determine the second signal processing device to be a master device or a slave device based on the interface communication. Accordingly, data exchange between the plurality of signal processing devices may be performed efficiently.

Meanwhile, in response to the non-uniform memory access not being supported while the processors in the second signal processing device are plural in number, the signal processing device may be configured to request resource information of the second signal processing device, to receive the resource information of the second signal processing device, and to determine the second signal processing device to be a master device or a slave device based on the received resource information of the second signal processing device. Accordingly, data exchange between the plurality of signal processing devices may be performed efficiently. Particularly, data exchange may be performed efficiently by determining a master device and a slave device based on the resource information. Further, the plurality of signal processing devices 170 and 170b may efficiently manage resources.

Meanwhile, in response to the processors in the second signal processing device not being plural in number, the signal processing device may be configured to exchange data with the second signal processing device through interface communication, and to determine the second signal processing device to be a master device or a slave device based on the interface communication. Accordingly, data exchange between the plurality of signal processing devices may be performed efficiently.

Meanwhile, in response to the processors in the second signal processing device not being plural in number, the signal processing device may be configured to exchange data through at least one of USB communication, Ethernet communication, or high-speed PCI communication. Accordingly, data exchange between the plurality of signal processing devices may be performed efficiently.

Meanwhile, in response to the processors in the second signal processing device not being plural in number and the interface communication not being supported, the signal processing device may be configured to determine the second signal processing device to be a slave device. Accordingly, data exchange between the plurality of signal processing devices may be performed efficiently.

Meanwhile, in response to a server virtual machine not being supported in the second signal processing device, the signal processing device may be configured to determine the second signal processing device to be a slave device. Accordingly, data exchange between the plurality of signal processing devices may be performed efficiently.

Meanwhile, in response to a server virtual machine being executed in the second signal processing device and the non-uniform memory access being supported, the signal processing device may be configured to determine the second signal processing device to be a master device. Accordingly, data exchange between the plurality of signal processing devices may be performed efficiently.

Meanwhile, in response to a server virtual machine being executed in the second signal processing device and the non-uniform memory access not being supported, the signal processing device may be configured to exchange data with the second signal processing device through interface communication, and to determine the second signal processing device to be a master device or a slave device based on the interface communication. Accordingly, data exchange between the plurality of signal processing devices may be performed efficiently.

Meanwhile, in response to a server virtual machine being executed in the second signal processing device and the non-uniform memory access not being supported, the signal processing device may be configured to request resource information of the second signal processing device, to receive the resource information of the second signal processing device, and to determine the second signal processing device to be a master device or a slave device based on the received resource information of the second signal processing device. Accordingly, data exchange between the plurality of signal processing devices may be performed efficiently.

Meanwhile, the resource information of the second signal processing device may be received via Scalable service-Oriented MiddlewarE over IP (SOME/IP) communication. Accordingly, data exchange between the plurality of signal processing devices may be performed efficiently.

Meanwhile, the signal processing device may be configured to further receive extension information and type information of the second signal processing device via the SOME/IP communication. Accordingly, data exchange between the plurality of signal processing devices may be performed efficiently.

A vehicle display apparatus according to another embodiment of the present disclosure includes: a first display and a second display mounted in a vehicle: a signal processing device configured to perform signal processing for at least one of the first display or the second display; and a second signal processing device configured to perform signal processing, wherein the signal processing device may be configured to determine whether the second signal processing device is a master device or a slave device, based on information as to whether a server virtual machine is executed in the second signal processing device and information on support of non-uniform memory access. Accordingly, data exchange between the plurality of signal processing devices may be performed efficiently. Particularly, data exchange may be performed efficiently by using an appropriate data communication scheme depending on a type of the second signal processing device.

BRIEF DESCRIPTION OF THE DRAWINGS

The embodiments will be described in detail with reference to the following drawings in which like reference numerals refer to like elements wherein:

FIGS. 8A to 10B are diagrams referred to in the description of FIG. 7;

DETAILED DESCRIPTION

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
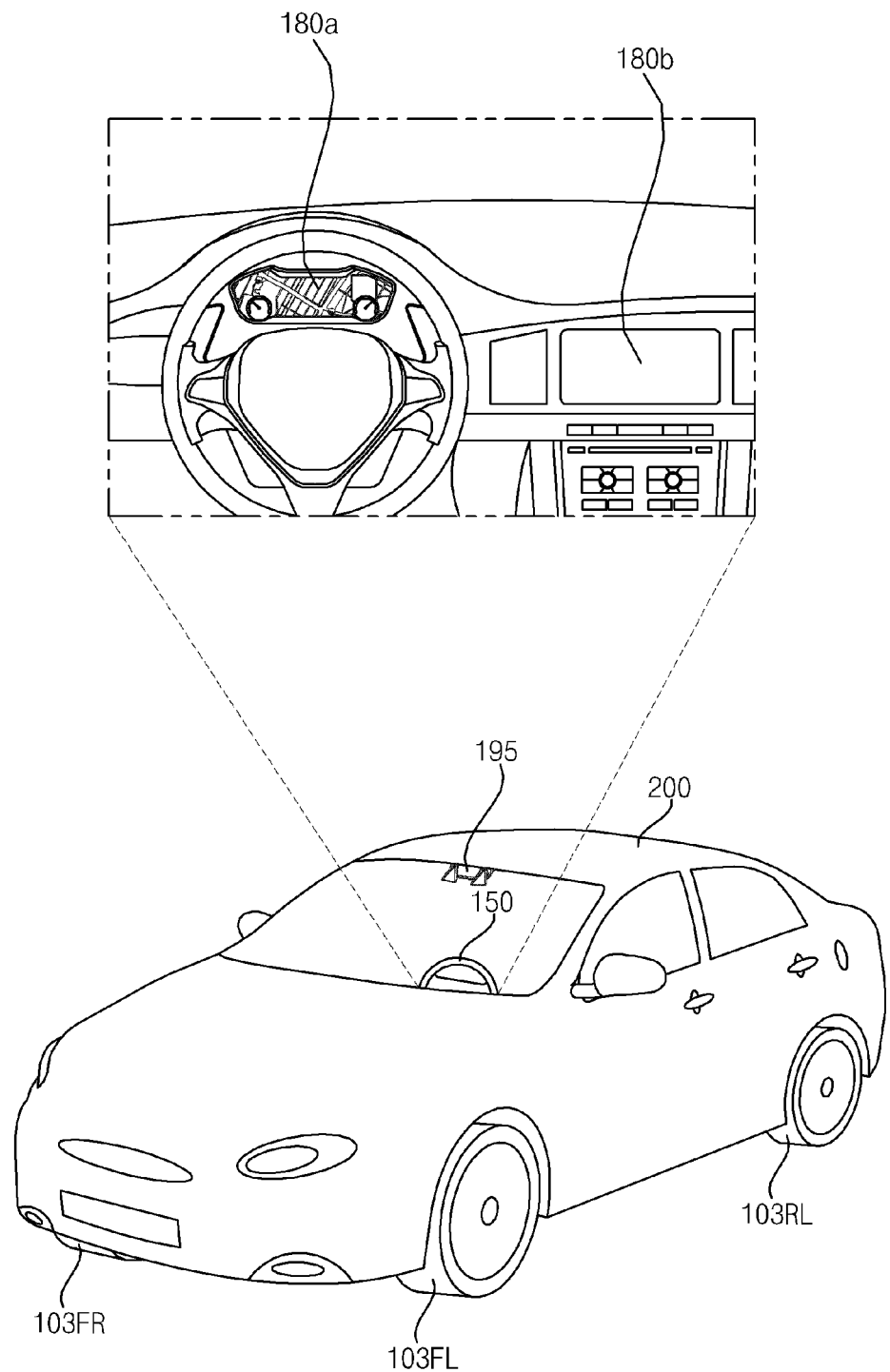
FIG. 1A is a view showing an example of the exterior and interior of a vehicle.

FIG. 1A is a view showing an example of the exterior and interior of a vehicle.

Referring to the figure, a vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

The embodiment of the present disclosure proposes a scheme for a display apparatus 100 for vehicles including a plurality of displays 180a and 180b to divide data processing.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 1B:
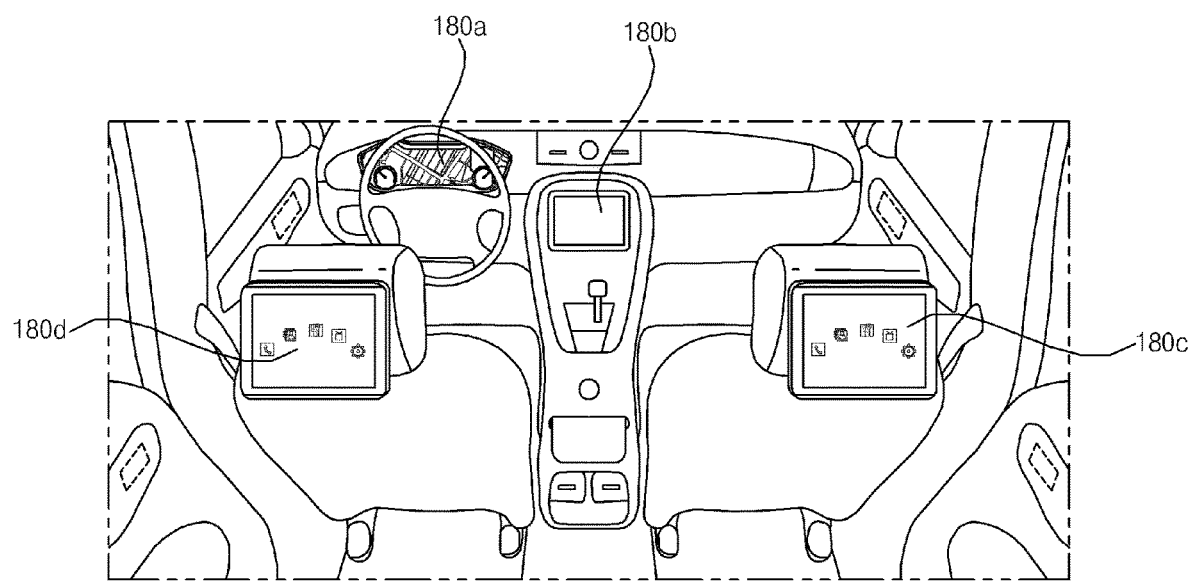
FIG. 1B is a view showing another example of the interior of the vehicle.

FIG. 1B is a view showing another example of the interior of the vehicle.

Referring to the figure, a cluster display 180a, an audio video navigation (AVN) display 180b, rear seat entertainment displays 180c and 180d, and a rear-view mirror display (not shown) may be located in the vehicle.

Figure 2:
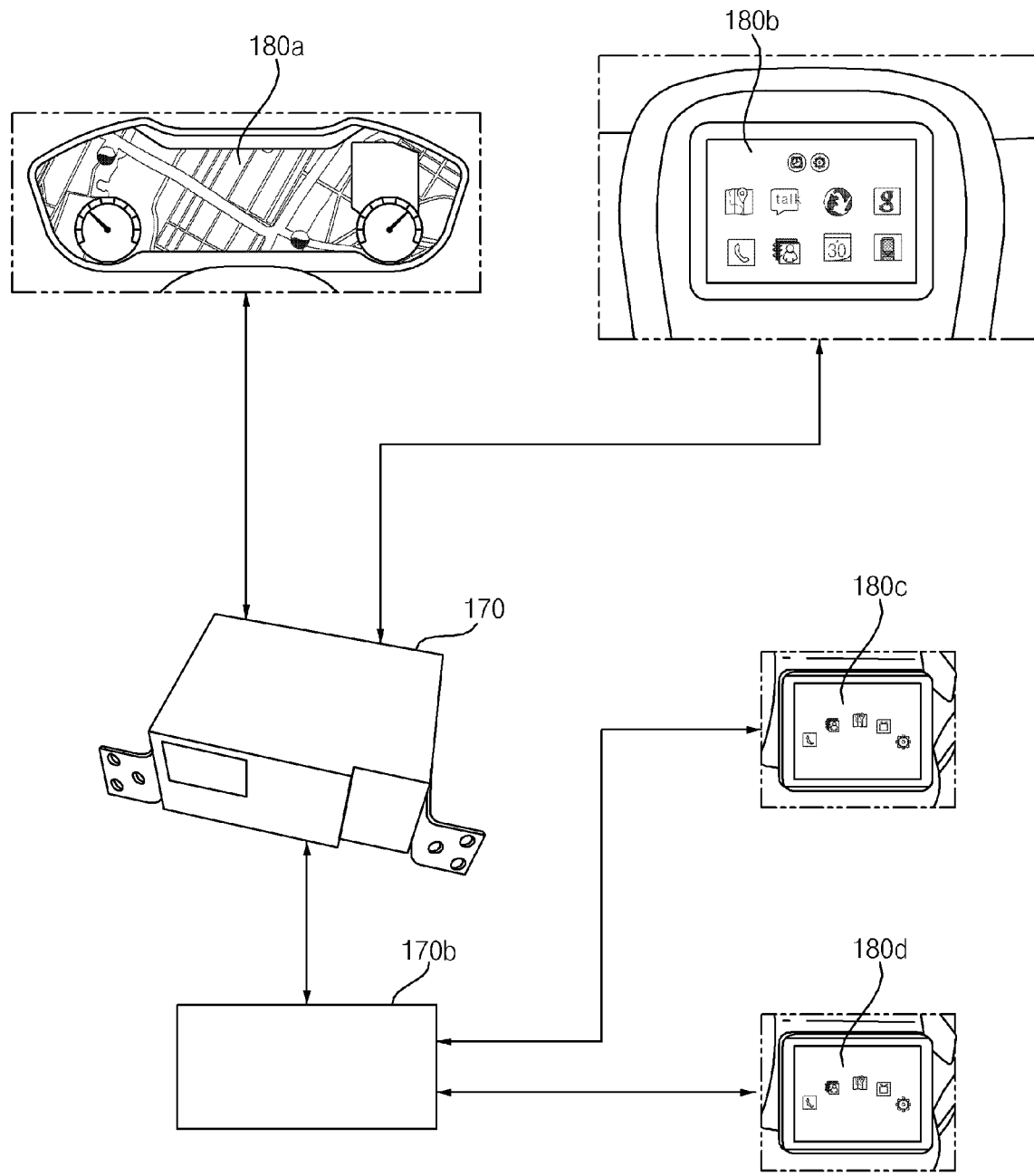
FIG. 2 is a view showing the external appearance of a display apparatus for vehicles according to an embodiment of the present disclosure.

FIG. 2 is a view showing the external appearance of a display apparatus for vehicles according to an embodiment of the present disclosure.

The display apparatus 100 for vehicles according to the embodiment of the present disclosure may include a plurality of displays 180a and 180b, a signal processing device 170 configured to perform signal processing in order to display images and information on the plurality of displays 180a and 180b, at least one display 180c and 180d, and a second signal processing device 170b configured to perform signal processing in order to display images and information on the at least one display 180c and 180d.

The signal processing device 170 and the second signal processing device 170b may be disposed spaced apart from each other.

Meanwhile, the second signal processing device 170b may be operated based on a different operating system (OS) from the signal processing device 170.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

In the at least one display 180c and 180d, the third display 180c may be a right rear seat entertainment display of the vehicle, and the fourth display 180d may be a left rear seat entertainment display of the vehicle.

The at least one display 180c and 180d may display driving state information, simple navigation information, various kinds of entertainment information, or an image.

The signal processing device 170 may have a processor 175 provided therein, and a server virtual machine 520 and first and second guest virtual machines 530 and 540 may be executed by a hypervisor 505 in the processor 175.

The server virtual machine 520 may correspond to a server virtual machine, and the first and second guest virtual machines may correspond to guest virtual machines.

Accordingly, interface communication may be performed between the server virtual machine 520 and the first guest virtual machine 530 or the second guest virtual machine 540 according to a server interface and a client interface, and data communication may be performed based on the interface communication.

The first guest virtual machine 530 may be operated for the first display 180a, and the second guest virtual machine 540 may be operated for the second display 180b.

Meanwhile, the server virtual machine 520 in the processor 175 may share at least some of data with the first guest virtual machine 530 and the second guest virtual machine 540 for divided processing of data.

Meanwhile, the server virtual machine 520 in the processor 175 may receive and process wheel speed sensor data of the vehicle, and may transmit the processed wheel speed sensor data to at least one of the first guest virtual machine 530 or the second guest virtual machine 540, or the second signal processing device 170b. Consequently, at least one virtual machine or the second signal processing device may share the wheel speed sensor data of the vehicle.

Meanwhile, the server virtual machine 520 in the processor 175 writes some of data in a first shared memory 508a so as to be transmitted to the first guest virtual machine 530, and writes some other of data in the first shared memory 508a so as to be transmitted to the second guest virtual machine 540. The first guest virtual machine 530 and the second guest virtual machine 540 process the received data, and may be configured to write the processed data in a second shared memory (not shown). Consequently, the plurality of signal processing devices in the vehicle may efficiently perform data processing.

Meanwhile, the server virtual machine 520 in the processor 175 may be configured to set a shared memory 508 based on the hypervisor 505 for transmission of the same data to the first guest virtual machine 530 and the second guest virtual machine 540. Consequently, the first display 180a and the second display 180b in the vehicle may display the same information or the same images in a synchronized state.

The signal processing device 170 may have the processor 175 therein, and may execute the server virtual machine 520 and the first and second guest virtual machines 530 and 540 on the hypervisor 505 in the processor 175.

The server virtual machine 520 may correspond to a server virtual machine, and the first and second guest virtual machines may correspond to guest virtual machines.

Accordingly, interface communication may be performed between the server virtual machine 520 and the first guest virtual machine 530 or the second guest virtual machine 540 according to a server interface and a client interface, and data communication may be performed based on the interface communication.

Meanwhile, the second signal processing device 170b may have a second processor 175b therein, and may execute a server virtual machine VIMc and a guest virtual machine VIMd on a hypervisor 505b in the second processor 175b.

Meanwhile, some of the plurality of displays 180a to 180d may be operated based on a Linux Operating System (OS), and others may be operated based on a Web Operating System (OS).

The signal processing device 170 and the second signal processing device 170b according to the embodiment of the present disclosure may divide and process data for the displays 180a to 180d configured to be operated under various operating systems.

Meanwhile, the signal processing device 170 and the second signal processing device 170b according to the embodiment of the present disclosure may be configured to also display the same information or the same images in a synchronized state in the displays 180a to 180d configured to be operated under various operating systems.

Meanwhile, the signal processing device 170 and the second signal processing device 170b according to the embodiment of the present disclosure may share at least some of data for divided processing of the data. Consequently, the plurality of signal processing devices 170 and 170b for the plurality of displays in the vehicle may divide and process data. In addition, the plurality of signal processing devices 170 and 170b may efficiently manage resources.

Figure 3:
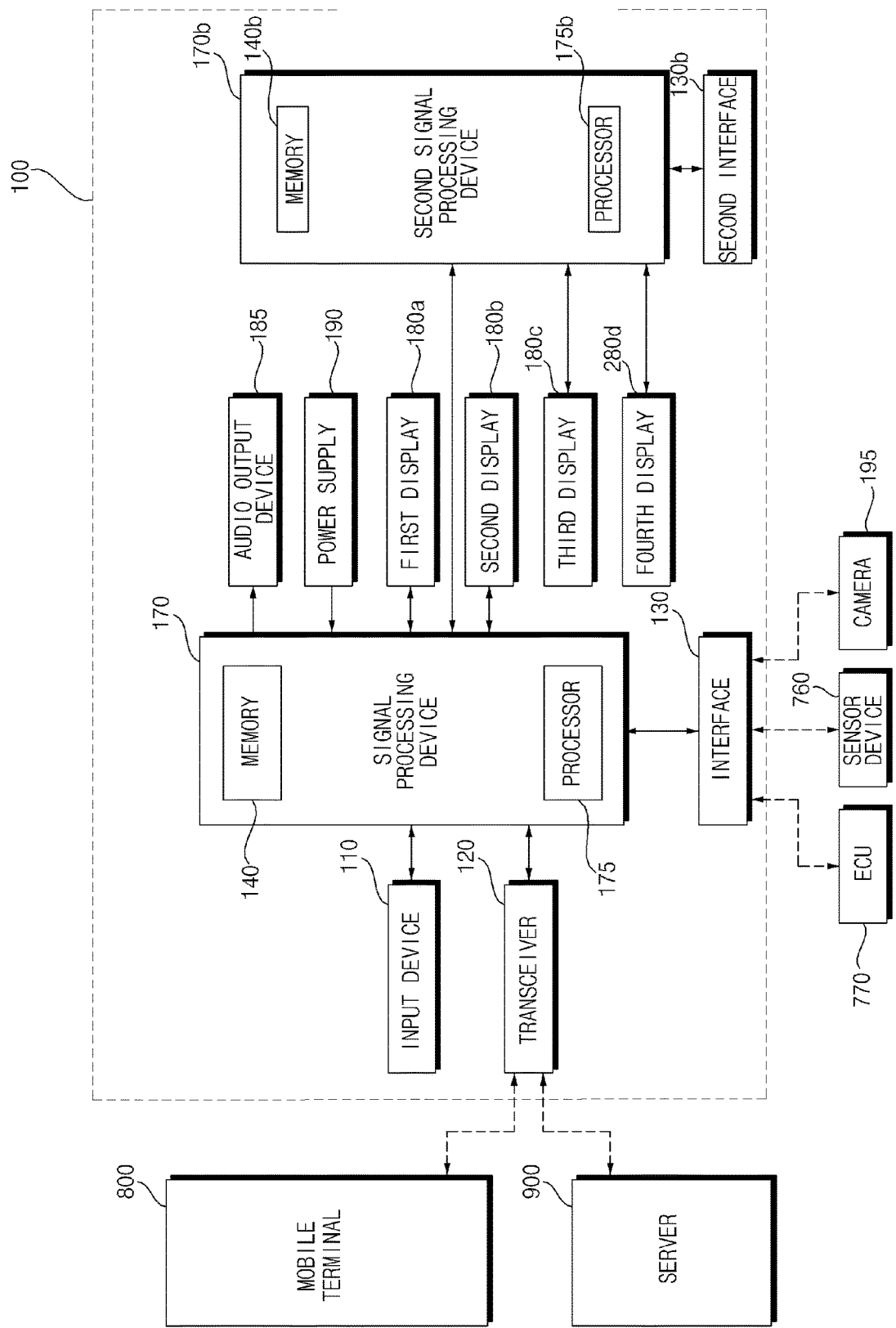
FIG. 3 illustrates an example of an internal block diagram of the display apparatus for vehicles of FIG. 2.

FIG. 3 illustrates an example of an internal block diagram of the display apparatus for vehicles according to the embodiment of the present disclosure.

Referring to the figure, the display apparatus 100 for vehicles according to the embodiment of the present disclosure may include an input device 110, a transceiver 120, an interface 130, a second interface 130b, a signal processing device 170, a second signal processing device 170b, a plurality of displays 180a to 180d, an audio output device 185, and a power supply 190.

The input device 110 may include a physical button or pad for button input or touch input.

Meanwhile, the input device 110 may include a microphone (not shown) for user voice input.

The transceiver 120 may wirelessly exchange data with a mobile terminal 800 or a server 900.

In particular, the transceiver 120 may wirelessly exchange data with a mobile terminal of a vehicle driver. Any of various data communication schemes, such as Bluetooth, Wi-Fi, WIFI Direct, and APIX, may be used as a wireless data communication scheme.

The transceiver 120 may receive weather information and road traffic situation information, such as transport protocol expert group (TPEG) information, from the mobile terminal 800 or the server 900. To this end, the transceiver 120 may include a mobile communication module (not shown).

The interface 130 may receive sensor information from an electronic control unit (ECU) 770 or a sensor device 760, and may transmit the received information to the signal processing device 170.

The second interface 130b may receive sensor information from the electronic control unit (ECU) 770 or the sensor device 760, and may transmit the received information to the second signal processing device 170b.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor.

Meanwhile, the position module may include a GPS module configured to receive GPS information.

Meanwhile, the interface 130 may receive front-of-vehicle image data, side-of-vehicle image data, rear-of-vehicle image data, and obstacle-around-vehicle distance information from a camera 195 or lidar (not shown), and may transmit the received information to the signal processing device 170.

The memory 140 may store various data necessary for overall operation of the display apparatus 100 for vehicles, such as programs for processing or control of the signal processing device 170.

For example, the memory 140 may store data about the hypervisor, the server virtual machine, and the first and second guest virtual machines executed by the hypervisor in the processor 175.

Meanwhile, as shown in the figure, the memory 140 may be provided in the signal processing device 170. However, the present disclosure is not limited thereto, and the memory 140 may be disposed outside the signal processing device 170.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the display apparatus 100 for vehicles.

For example, the signal processing device 170 may include a processor 175 configured to perform signal processing for at least one of the first display 180a or the second display 180b and a memory 140.

The processor 175 may execute the server virtual machine 520 and the first and second guest virtual machines 530 and 540 on the hypervisor 505 (see FIG. 5) in the processor 175.

Among the server virtual machine 520 and the first and second guest virtual machines 530 and 540 (see FIG. 5), the server virtual machine 520 may be called a server virtual machine, and the first and second guest virtual machines 530 and 540 may be called guest virtual machines.

The first guest virtual machine 530 may be operated for the first display 180a, and the second guest virtual machine 540 may be operated for the second display 180b.

For example, the server virtual machine 520 in the processor 175 may receive, process, and output vehicle sensor data, position information data, camera image data, audio data, or touch input data. Data processed only by a legacy virtual machine and data processed by the server virtual machine 520 may be distinguished from each other, whereby data processing may be efficiently performed. In particular, the server virtual machine 520 may process most of the data, whereby 1:N data sharing may be achieved.

As another example, the server virtual machine 520 may directly receive and process CAN communication data, audio data, radio data, USB data, and wireless communication data for the first and second guest virtual machines 530 and 540.

The server virtual machine 520 may transmit the processed data to the first and second guest virtual machines 530 and 540.

Consequently, only the server virtual machine 520, among the server virtual machine 520 and the first and second guest virtual machines 530 and 540, may receive communication data and external input data, and may perform signal processing, whereby load in signal processing by the other virtual machines may be reduced and 1:N data communication may be achieved, and therefore synchronization at the time of data sharing may be achieved.

Meanwhile, the server virtual machine 520 in the processor 175 writes some of data in the first shared memory 508a so as to be transmitted to the first guest virtual machine 530, and writes some other of data in the first shared memory 508a so as to be transmitted to the second guest virtual machine 540. The first guest virtual machine 530 and the second guest virtual machine 540 process the received data, and may be configured to write the processed data in the second shared memory (not shown). Consequently, data processing may be efficiently performed between the plurality of signal processing devices in the vehicle.

At this time, data may be any one of image data, audio data, navigation data, and voice recognition data.

Meanwhile, the server virtual machine 520 may process some other of data, and may be configured to write the processed data in the second shared memory (not shown). That is, the server virtual machine 520 may perform data processing in addition to the first guest virtual machine 530 and the second guest virtual machine 540.

Meanwhile, the server virtual machine 520 may create command queues for distributed processing of data in the first guest virtual machine 530 and the second guest virtual machine 540. Consequently, the plurality of virtual machines may divide and process data.

Meanwhile, in response to the first guest virtual machine 530 and the second guest virtual machine 540 sharing the same data, the server virtual machine 520 in the processor 175 may create one command queue. Consequently, the same data may be synchronized and shared.

Meanwhile, the server virtual machine 520 may create command queues corresponding to the number of virtual machines for distributed processing of data.

Meanwhile, the server virtual machine 520 may be configured to transmit write at least some of data to at least one of the first guest virtual machine 530 or the second guest virtual machine 540, or the second signal processing device 170b for distributed processing of data.

For example, the server virtual machine 520 may allocate the first shared memory 508a for transmitting at least some of data to at least one of the first guest virtual machine 530 or the second guest virtual machine 540, or the second signal processing device 170b, and image data processed by the first guest virtual machine 530 or the second guest virtual machine 540 may be written in the second shared memory (not shown).

Meanwhile, the server virtual machine 520 may be configured to write data in the shared memory 508, whereby the first guest virtual machine 530 and the second guest virtual machine 540 share the same data.

For example, the server virtual machine 520 may be configured to write radio data or wireless communication data in the shared memory 508, whereby the first guest virtual machine 530 and the second guest virtual machine 540 share the same data. Consequently, 1:N data sharing may be achieved.

Eventually, the server virtual machine 520 may process most of the data, whereby 1:N data sharing may be achieved.

Meanwhile, the server virtual machine 520 in the processor 175 may be configured to set the shared memory 508 based on the hypervisor 505 in order to transmit the same data to the first guest virtual machine 530 and the second guest virtual machine 540.

That is, the server virtual machine 520 in the processor 175 may transmit the same data to the first guest virtual machine 530 and the second guest virtual machine 540 in a synchronized state using the shared memory 508 based on the hypervisor 505. Consequently, the plurality of displays 180a and 180b in the vehicle may display the same images in a synchronized state.

Meanwhile, the signal processing device 170 may process various signals, such as an audio signal, an image signal, and a data signal. To this end, the signal processing device 170 may be implemented in the form of a system on chip (SOC).

The second signal processing device 170b performs signal processing for the displays 180c and 180d for vehicles, and may include a second processor 175b and a second memory 140b to this end.

The second processor 175b may execute the server virtual machine VIMc (FIG. 9) and the guest virtual machine VIMd (FIG. 9) and 540b on the hypervisor 505b (FIG. 9) in the second processor 175b.

For example, the server virtual machine VIMc in the second processor 175b may receive, process, and output vehicle sensor data, position information data, camera image data, audio data, or touch input data from the server virtual machine 520 in the processor 175 in the signal processing device 170.

As another example, the server virtual machine VIMc may receive and process CAN communication data, audio data, radio data, USB data, and wireless communication data from the server virtual machine 520 in the processor 175 in the signal processing device 170 for the guest virtual machine VIMd.

The server virtual machine VIMc may transmit the processed data to the guest virtual machine VIMd.

Consequently, only the server virtual machine VIMc, which is one of the server virtual machine VIMc and the guest virtual machine VIMd, may receive communication data and external input data, and may perform signal processing, whereby signal processing load of the guest virtual machine VIMd may be reduced and 1:N data communication may be achieved, and therefore synchronization at the time of data sharing may be achieved.

Meanwhile, the server virtual machine VIMc may write some of data in the shared memory (not shown) so as to be transmitted to the guest virtual machine VIMd, and the guest virtual machine VIMd may process the received data, and may be configured to write the processed data in the shared memory (not shown). Consequently, the plurality of signal processing devices for the plurality of displays in the vehicle may divide and process data.

At this time, data may be any one of image data, audio data, navigation data, and voice recognition data.

Meanwhile, the server virtual machine VIMc may create command queues for distributed processing of data in the plurality of virtual machines. Consequently, the plurality of virtual machines may divide and process data.

Meanwhile, in response to plurality of virtual machines sharing the same data, the server virtual machine VIMc in the second processor 175b may create one command queue. Consequently, the same data may be synchronized and shared.

Meanwhile, the server virtual machine VIMc may create command queues corresponding to the number of virtual machines for distributed processing of data.

Meanwhile, the server virtual machine VIMc may be configured to transmit write at least some of data to the guest virtual machine VIMd for distributed processing of data.

For example, the server virtual machine VIMc may allocate the shared memory (not shown) for transmitting at least some of data to the guest virtual machine VIMd, and image data processed by the guest virtual machine VIMd may be written in the shared memory (not shown).

Meanwhile, the server virtual machine VIMc may be configured to write data in the shared memory (not shown), whereby the guest virtual machine VIMd shares the same data.

For example, the server virtual machine VIMc may be configured to write radio data or wireless communication data in the shared memory (not shown), whereby the guest virtual machine VIMd shares the same data. Consequently, 1:N data sharing may be achieved.

Eventually, the server virtual machine VIMc may process most of the data, whereby 1:N data sharing may be achieved.

Meanwhile, the server virtual machine VIMc in the second processor 175b may be configured to set the shared memory (not shown) based on the hypervisor 505b in order to transmit the same data to the guest virtual machine VIMd.

That is, the server virtual machine VIMc in the second processor 175b may transmit the same data to the guest virtual machine VIMd in a synchronized state using the shared memory (not shown) based on the hypervisor 505b. Consequently, the plurality of displays 180c and 180d in the vehicle may display the same images in a synchronized state.

Meanwhile, the second signal processing device 170b may process various signals, such as an audio signal, an image signal, and a data signal. To this end, the second signal processing device 170b may be implemented in the form of a system on chip (SOC).

Figure 4:
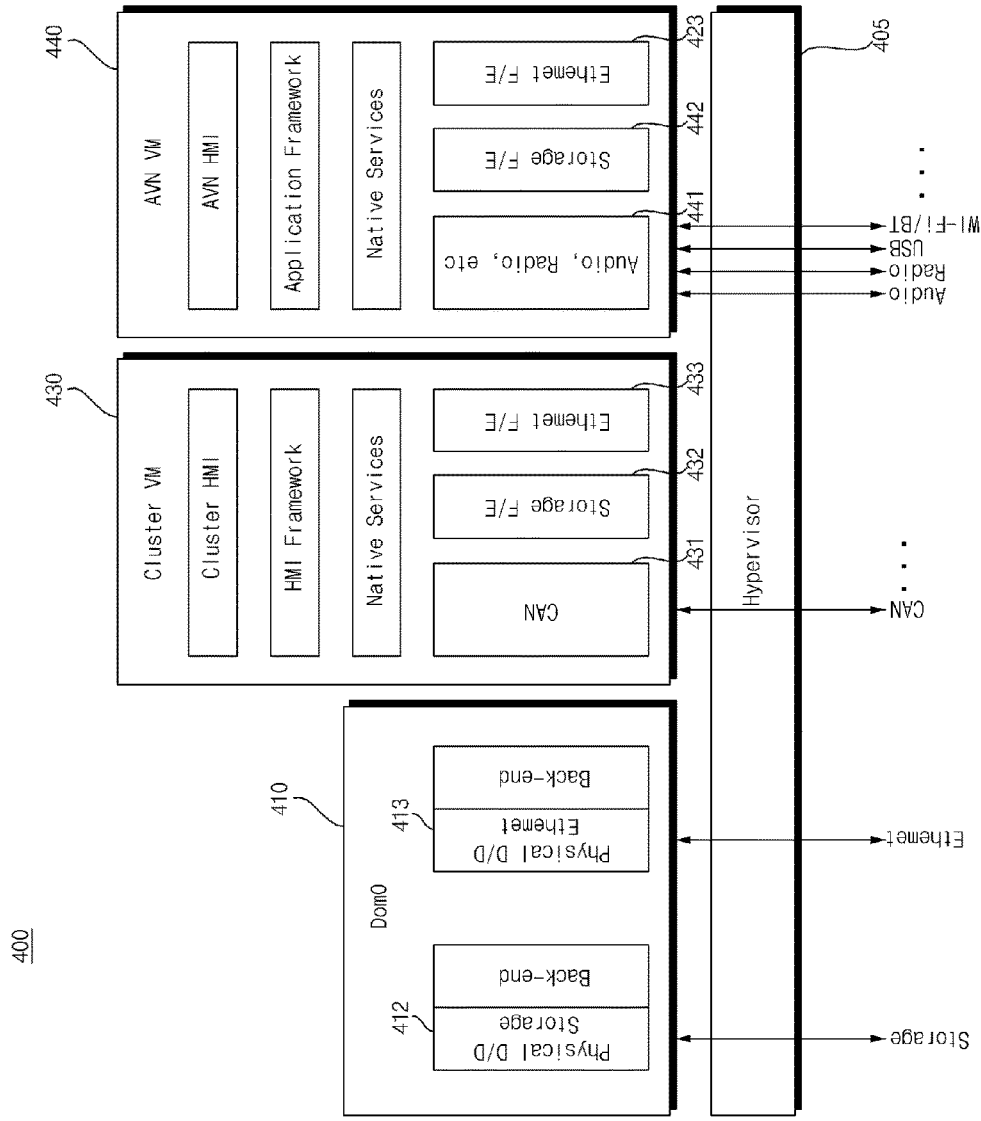
FIG. 4 is a view showing a system executed in a signal processing device related to the present disclosure.

FIG. 4 is a view showing a system executed in a signal processing device related to the present disclosure.

Referring to the figure, FIG. 4 is a view illustrating that virtual machines are used for the cluster display 180a and the AVN display 180b.

The system 400 executed in the signal processing device of FIG. 4 illustrates that a cluster virtual machine 430 and an AVN virtual machine 440 are executed on a hypervisor 405 in the processor 175 in the signal processing device 170.

Meanwhile, the system 400 executed in the signal processing device of FIG. 4 illustrates that a legacy virtual machine 410 is also executed on the hypervisor 405 in the processor 175.

The legacy virtual machine 410 may include an interface 412 for data communication with the memory 140 and an interface 413 for Ethernet communication.

Meanwhile, the cluster virtual machine 430 may include an interface 431 for CAN communication, an interface 432 for communication with the interface 412 of the legacy virtual machine 410, and an interface 433 for communication with the interface 413 of the legacy virtual machine 410.

Meanwhile, the AVN virtual machine 440 may include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there is a disadvantage in that CAN communication data are input and output only in the cluster virtual machine 430, whereby the CAN communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a disadvantage in that the cluster virtual machine 430 and the AVN virtual machine 440 are required to include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines for inputting and outputting various memory data and communication data not in the guest virtual machines but in the server virtual machine. This will be described with reference to FIG. 5 and subsequent figures.

Figure 5:
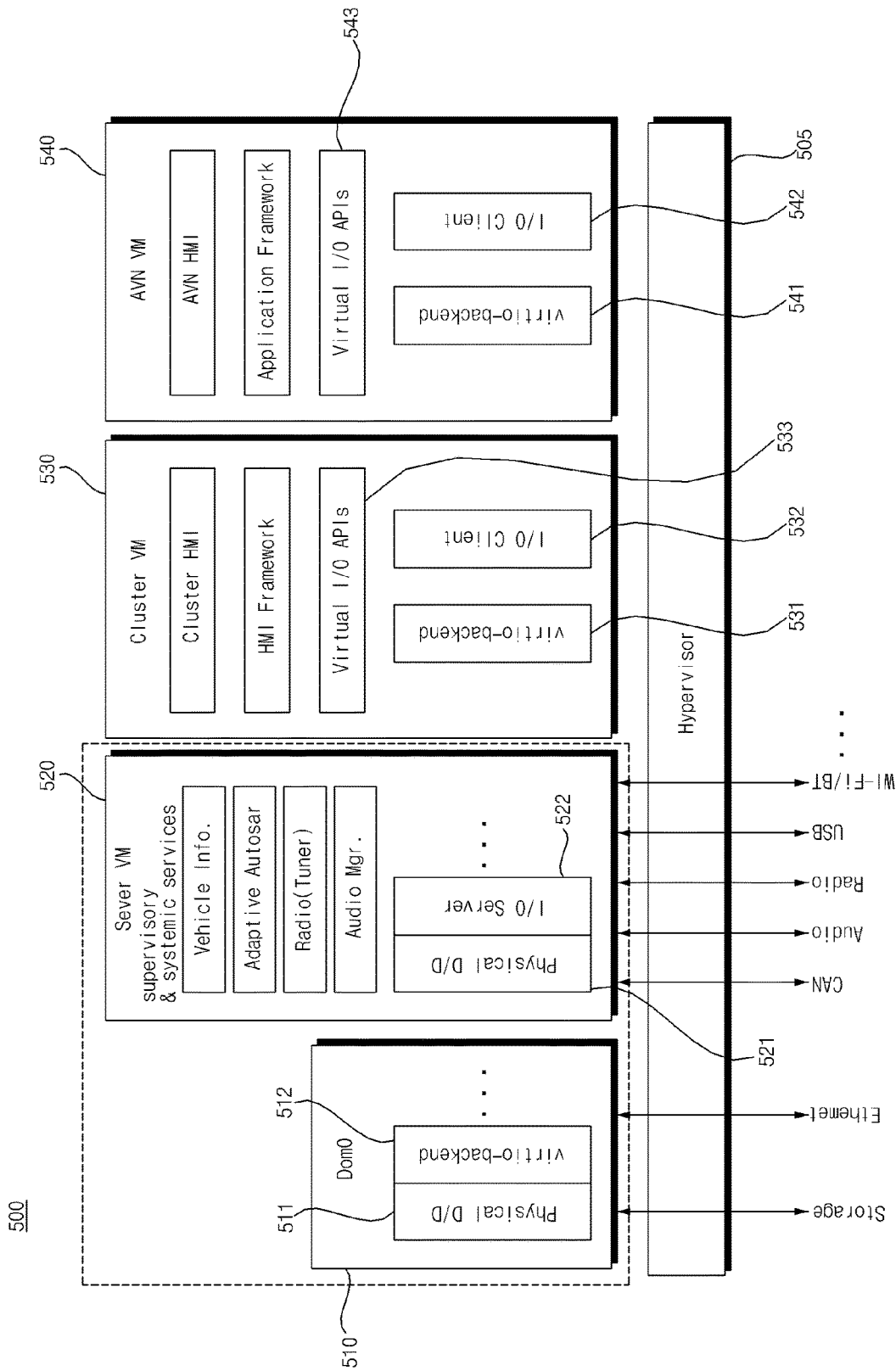
FIG. 5 is a view showing an example of a system executed in a signal processing device according to an embodiment of the present disclosure.

FIG. 5 is a view showing an example of a system executed in a signal processing device according to an embodiment of the present disclosure.

Referring to the figure, the system 500 of FIG. 5 illustrates that the server virtual machine 520, the first guest virtual machine 530, and the second guest virtual machine 540 are executed on the hypervisor 505 in the processor 175 of the signal processing device 170.

The first guest virtual machine 530 may be a virtual machine for the cluster display 180a, and the second guest virtual machine 540 may be a virtual machine for the AVN display 180b.

That is, the first guest virtual machine 530 and the second guest virtual machine 540 may be operated for image rendering of the cluster display 180a and the AVN display 180b, respectively.

Meanwhile, the system 50 executed in the signal processing device 170 of FIG. 5 illustrates that a legacy virtual machine 510 is also executed on the hypervisor 505 in the processor 175.

The legacy virtual machine 510 may include an interface 511 for data communication with the memory 140 and Ethernet communication.

Meanwhile, the legacy virtual machine 510 may further include a virtio-backend interface 512 for data communication with the first and second guest virtual machines 530 and 540.

The server virtual machine 520 may include an interface 521 for input and output of audio data, radio data, USB data, and wireless communication data and an input and output server interface 522 for data communication with the guest virtual machines.

That is, the server virtual machine 520 may provide inputs/outputs (I/O) difficult to virtualize with standard virtualization technology (VirtIO) to a plurality of guest virtual machines, such as the first and second guest virtual machines 530 and 540.

Meanwhile, the server virtual machine 520 may control radio data and audio data at a supervisor level, and may provide the data to a plurality of guest virtual machines, such as the first and second guest virtual machines 530 and 540.

Meanwhile, the server virtual machine 520 may process vehicle data, sensor data, and surroundings-of-vehicle information, and may provide the processed data or information to a plurality of guest virtual machines, such as the first and second guest virtual machines 530 and 540.

Meanwhile, the server virtual machine 520 may provide supervisory services, such as processing of vehicle data and audio routing management.

Next, the first guest virtual machine 530 may include an input and output client interface 532 for data communication with the server virtual machine 520 and APIs 533 configured to control the input and output client interface 532.

In addition, the first guest virtual machine 530 may include a virtio-backend interface for data communication with the legacy virtual machine 510.

The first guest virtual machine 530 may receive memory data by communication with the memory 140 and Ethernet data by Ethernet communication from the virtio-backend interface 512 of the legacy virtual machine 510 through the virtio-backend interface.

Next, the second guest virtual machine 540 may include an input and output client interface 542 for data communication with the server virtual machine 520 and APIs 543 configured to control the input and output client interface 542.

In addition, the second guest virtual machine 540 may include a virtio-backend interface for data communication with the legacy virtual machine 510.

The second guest virtual machine 540 may receive memory data by communication with the memory 140 and Ethernet data by Ethernet communication from the virtio-backend interface 512 of the legacy virtual machine 510 through the virtio-backend interface.

Meanwhile, the legacy virtual machine 510 may be provided in the server virtual machine 520, unlike FIG. 5.

In the system 500, CAN communication data are input and output only in the server virtual machine 520, but may be provided to a plurality of guest virtual machines, such as the first and second guest virtual machines 530 and 540, through data processing in the server virtual machine 520. Consequently, 1:N data communication by processing of the server virtual machine 520 may be achieved.

Also, in the system 500 of FIG. 5, audio data, radio data, USB data, and wireless communication data are input and output only in the server virtual machine 520, but may be provided to a plurality of guest virtual machines, such as the first and second guest virtual machines 530 and 540, through data processing in the server virtual machine 520. Consequently, 1:N data communication by processing of the server virtual machine 520 may be achieved.

Meanwhile, in the system 500 of FIG. 5, the first and second guest virtual machines 530 and 540 may be operated based on different operating systems.

For example, the first guest virtual machine 530 may be operated based on a Linux OS, and the second guest virtual machine 540 may be operated based on a Web OS.

In the server virtual machine 520, the shared memory 508 based on the hypervisor 505 may be set for data sharing, even though the first and second guest virtual machines 530 and 540 are operated based on different operating systems. Even though the first and second guest virtual machines 530 and 540 are operated based on different operating systems, therefore, the same data or the same images may be shared in a synchronized state. Eventually, the plurality of displays 180a and 180b may display the same data or the same images in a synchronized state.

Figure 6:
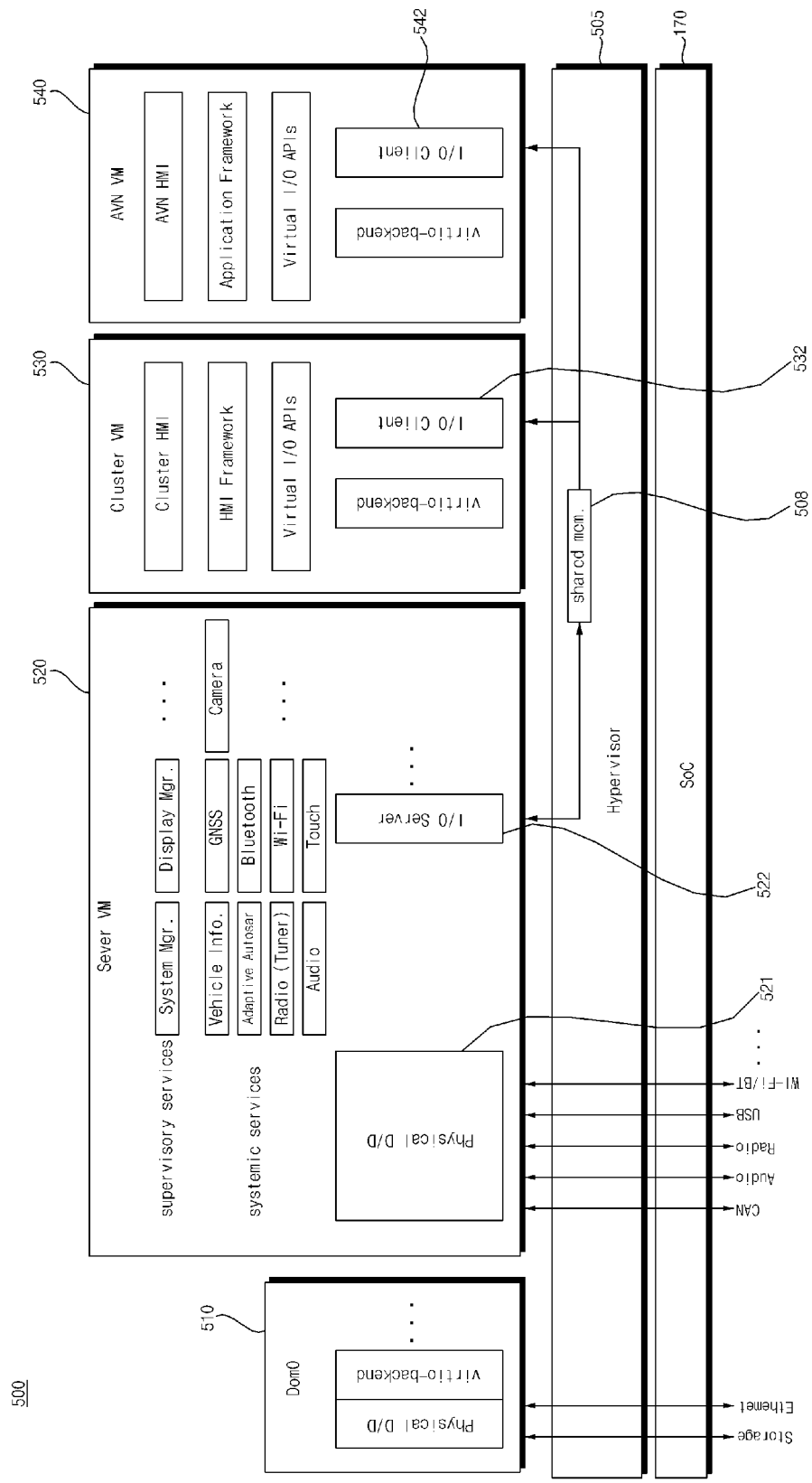
FIG. 6 is a view referred to in the description of operation of the system executed in the signal processing device according to the embodiment of the present disclosure.

FIG. 6 is a view referred to in the description of operation of the system executed in the signal processing device according to the embodiment of the present disclosure.

Referring to the figure, the processor 175 in the signal processing device 170 executes the server virtual machine 520 and the first and second guest virtual machines 530 and 540 on the hypervisor 505 in the processor 175, and the server virtual machine 520 in the processor 175 is configured to set the shared memory 508 based on the hypervisor 505 for transmission of the same data to the first and second guest virtual machines 530 and 540.

For example, the same image data may be illustrated as the same data. Consequently, the plurality of displays 180a and 180b in the vehicle may display the same images in a synchronized state.

Meanwhile, in the system 500 of FIG. 6, the processor 175 in the signal processing device 170 executes the server virtual machine 520 and the first and second guest virtual machines 530 and 540 on the hypervisor 505 in the processor 175, and the server virtual machine 520 in the processor 175 may transmit the same data to the first and second guest virtual machines 530 and 540 in a synchronized state using the shared memory 508 based on the hypervisor 505.

For example, CAN communication data, audio data, radio data, USB data, wireless communication data, position information data, or touch data may be illustrated as the same data. Consequently, the plurality of displays 180a and 180b in the vehicle may display the same data in a synchronized state.

Meanwhile, although not shown in FIG. 6, the legacy virtual machine 510 may transmit memory data from the memory 140 and Ethernet data by Ethernet communication to the first and second guest virtual machines 530 and 540 in a synchronized state using the shared memory 508 based on the hypervisor 505. That is, it is possible to perform 1:N data communication with respect to the memory data or the Ethernet data, whereby it is possible to transmit the same data in a synchronized state.

Meanwhile, in the case where a plurality of signal processing devices 170 and 170b are provided in the vehicle display apparatus 100 of FIG. 2, it is preferred to divide the plurality of signal processing devices 170 and 170b into a master device and a slave device for efficient data exchange between the plurality of signal processing devices 170 and 170b.

To this end, the embodiment of the present disclosure proposes a scheme for setting the plurality of signal processing devices 170 and 170b as a master device and a slave device.

The vehicle display apparatus 100 according to an embodiment of the present disclosure may include a first display 180a and a second display 180b which are located in a vehicle, a signal processing device 170 configured to perform signal processing for at least one of the first display 180a or the second display 180b, and a second signal processing device 170b configured to perform signal processing, wherein the signal processing device 170 is configured to determine whether the second signal processing device 170b is a master device or a slave device based on number information of processors in the second signal processing device 170b and information on support of non-uniform memory access. Accordingly, data exchange between the plurality of signal processing devices 170 and 170b may be performed efficiently. Particularly, data exchange may be performed efficiently by using an appropriate data communication scheme depending on a type of the second signal processing device 170b.

Meanwhile, the vehicle display apparatus 100 according to another embodiment of the present disclosure may include a first display 180a and a second display 180b which are located in vehicle, a signal processing device 170 configured to perform signal processing for at least one of the first display 180a or the second display 180b, and a second signal processing device 170b configured to perform signal processing, wherein the signal processing device 170 is configured to determine whether the second signal processing device 170b is a master device or a slave device based on information as to whether a server virtual machine is executed in the second signal processing device 170b and information on support of non-uniform memory access. Accordingly, data exchange between the plurality of signal processing devices 170 and 170b may be performed efficiently. Particularly, data exchange may be performed efficiently by using an appropriate data communication scheme depending on a type of the second signal processing device 170b.

The scheme for setting the plurality of signal processing devices 170 and 170b as a master device and a slave device will be described in further detail below with reference to FIG. 7 and the following figures.

Figure 7:
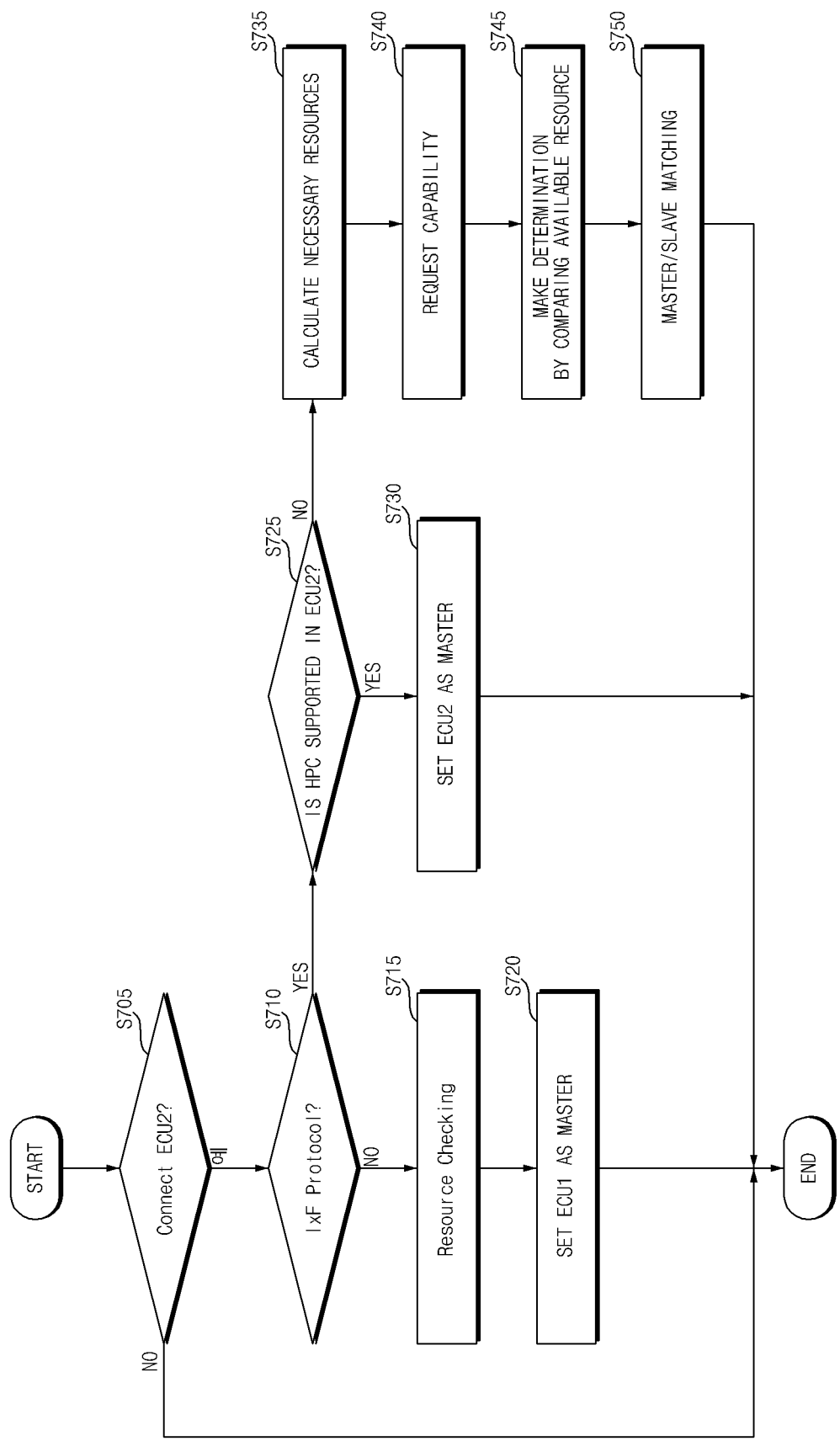
FIG. 7 is a flowchart illustrating an example of an operation method of a vehicle display apparatus according to an embodiment of the present disclosure.

FIG. 7 is a flowchart illustrating an example of an operation method of a vehicle display apparatus according to an embodiment of the present disclosure.

Referring to the drawing, the signal processing device 170 determines whether the signal processing device 170b is electrically connected thereto (S705).

For example, the signal processing device 170 may transmit a data request signal to the second signal processing device 170b.

If the second signal processing device 170b transmits a data response signal in response to the data request signal, the signal processing device 170 may determine that the second signal processing device 170b is electrically connected thereto.

In another example, if the second signal processing device 170b does not transmit a data response signal, the signal processing device 170 may determine that the second signal processing device 170b is not electrically connected thereto.

If the second signal processing device 170b is electrically connected to the signal processing device 170 in operation 705 (S705), operation 710 (S710) and the following operations may be performed.

The signal processing device 170 may determine whether interface communication is supported in the second signal processing device 170b (S710).

For example, the signal processing device 170 may transmit a request as to whether the interface communication is supported to the second signal processing device 170b, and if it is possible to support the interface communication, the second signal processing device 170b may transmit a response signal, indicating that the interface communication is available, to the signal processing device 170. Based on the response signal indicating that the interface communication is available, the signal processing device 170 may determine that the interface communication is supported.

In another example, the signal processing device 170 may transmit a request as to whether a server virtual machine is supported to the second signal processing device 170b, and if it is possible to support the server virtual machine, the second signal processing device 170b may transmit a response signal, indicating that the server virtual machine is available, to the signal processing device 170. Based on the response signal indicating that the server virtual machine is available, the signal processing device 170 may determine that the interface communication is supported.

Meanwhile, if the interface communication is not supported in the second signal processing device 170b in operation 710 (S710), operation 715 (S715) and operation 720 (S720) may be performed.

The signal processing device 170 may transmit a request for resource information to the second signal processing device 170b, and in response to the request, the second signal processing device 170b may transmit resource information to the second signal processing device 170b (S715).

Meanwhile, operation 715 (S715) in the drawing may be omitted.

Then, the signal processing device 170 may set the second signal processing device 170b as a slave device (S720). In addition, the signal processing device 170 may set the signal processing device 170 as a master device.

As a result, based on operation 720 (S720), if a server virtual machine 520b is not supported in the second signal processing device 170b, the signal processing device 170 may determine the second signal processing device 170b to be a slave device. Accordingly, data exchange between the plurality of signal processing devices 170 and 170b may be performed efficiently.

Then, if the interface communication is supported in the second signal processing device 170b in operation 710 (S710), operation 725 (S725) and the following operations may be performed.

Meanwhile, if the interface communication is supported in the second signal processing device 170b, the server virtual machine 520b may be supported such that the second signal processing device 170b may execute the server virtual machine 520b.

For example, if the interface communication is supported in the second signal processing device 170b, the processor 175b in the second signal processing device 170b may execute the server virtual machine 520b on the hypervisor 505b.

Meanwhile, if the interface communication is supported in the second signal processing device 170b, the signal processing device 170 determines whether High-Performance Computing (HPC) is supported in the second signal processing device 170b (S725).

For example, the signal processing device 170 may transmit a request as to whether distribution of input/output (I/O) resources is supported, and if it is possible to distribute I/O resources, the second signal processing device 170b may transmit a response signal, indicating that distribution of I/O resources is possible, to the signal processing device 170. Based on the response signal indicating that distribution of I/O resources is possible, the signal processing device 170 may determine that the distribution of I/O resources is possible and determine that the second signal processing device 170b is capable of High-Performance Computing (HPC).

Meanwhile, if the High-Performance Computing (HPC) is supported in the second signal processing device 170b, the signal processing device 170 sets the second signal processing device 170b as a master device (S730). Further, the signal processing device 170 sets the signal processing device 170 as a slave device.

For example, if the High-Performance Computing (HPC) is supported in the second signal processing device 170b, the signal processing device 170 may control the second signal processing device 170b to operate as a master device using resources, such as a Central Processor (CPU), a Graphics Processor (GPU), a Neural Network Processor (NPU), and the like provided in the second signal processing device 170b.

If the High-Performance Computing (HPC) is supported in the second signal processing device 170b, the second signal processing device 170b has a superior performance to the signal processing device 170, such that the signal processing device 170 mainly controls display and functions as one node in the HPC topology.

That is, based on operation 730 (S730), if the interface communication and HPC are supported in the second signal processing device 170b, the signal processing device 170 may control the second signal processing device 170b to operate as a master device.

Meanwhile, if the HPC is not supported for the second signal processing device 170*b* in operation 725 (S725), operation 735 (S735) and the following operations may be performed.

The signal processing device 170 may calculate necessary resources (S735).

For example, the signal processing device 170 may calculate resource information thereof.

Then, the signal processing device 170 may transmit a request for resource information or capability information to the second signal processing device 170*b* (S740).

In this case, the resource information or capability information of the second signal processing device 170*b* may include resource information of the central processor, resource information of the graphic processor, resource information of the neural network processor, security information, network information such as communication and the like, cloud access information, and the like.

Then, the second signal processing device 170*b* may transmit the calculated resource information or capability information to the signal processing device 170.

Meanwhile, the resource information or capability information of the second signal processing device 170*b* may be received via Scalable service-Oriented MiddlewarE over IP (SOME/IP) communication. Accordingly, data exchange between the plurality of signal processing devices 170 and 170*b* may be performed efficiently.

Meanwhile, the signal processing device 170 may further receive extension information and type information of the second signal processing device 170*b* via the SOME/IP communication. Accordingly, exchange of various data between the plurality of signal processing devices 170 and 170*b* may be performed efficiently.

Then, the signal processing device 170 may make determination by comparing resource information therein with the resource information or capability information of the second signal processing device 170*b* (S745).

Further, the signal processing device 170 may determine a master device and a slave device by comparing resource information therein with the resource information or capability information of the second signal processing device 170*b* (S745).

For example, by comparing the resource information of the signal processing device 170 with the resource information of the second signal processing device 170*b*, the signal processing device 170 may determine the signal processing device 170, which has lower resource usage, and thus is assigned a higher level, to be a master device.

In another example, by comparing the resource information of the signal processing device 170 with the resource information of the second signal processing device 170*b*, the signal processing device 170 may determine the second signal processing device 170*b*, which has lower resource usage, and thus is assigned a higher level, to be a master device.

That is, based on operation 745 (S745), if the interface communication is supported but the HPC is not supported in the second signal processing device 170*b*, the signal processing device 170 may compare the resource information of the signal processing device 170 with the resource information of the second signal processing device 170*b*, and may determine a device, which has lower resource usage, and thus is assigned a higher level, to be a master device. Accordingly, data exchange between the plurality of signal processing devices 170 and 170*b* may be performed efficiently.

FIGS. 8A to 10B are diagrams referred to in the description of FIG. 7.

First, FIG. 8A is a diagram illustrating an example of resource information of the second signa processing device 170*b*.

Referring to the drawing, the resource information of the second signal processing device 170*b* may include resource information of the central processor CPU, resource information of the graphics processor GPU, resource information of the neural network processor NPU, security information, network information such as 4G and 5G communications, and the like.

FIG. 8B is a diagram illustrating another example of resource information of the second signal processing device 170*b*.

Referring to the drawing, the resource information of the second signal processing device 170*b* may include resource information of the central processor CPU, resource information of the graphics processor GPU, resource information of a digital processor DSP, cloud access information, and the like.

Figure 9A:
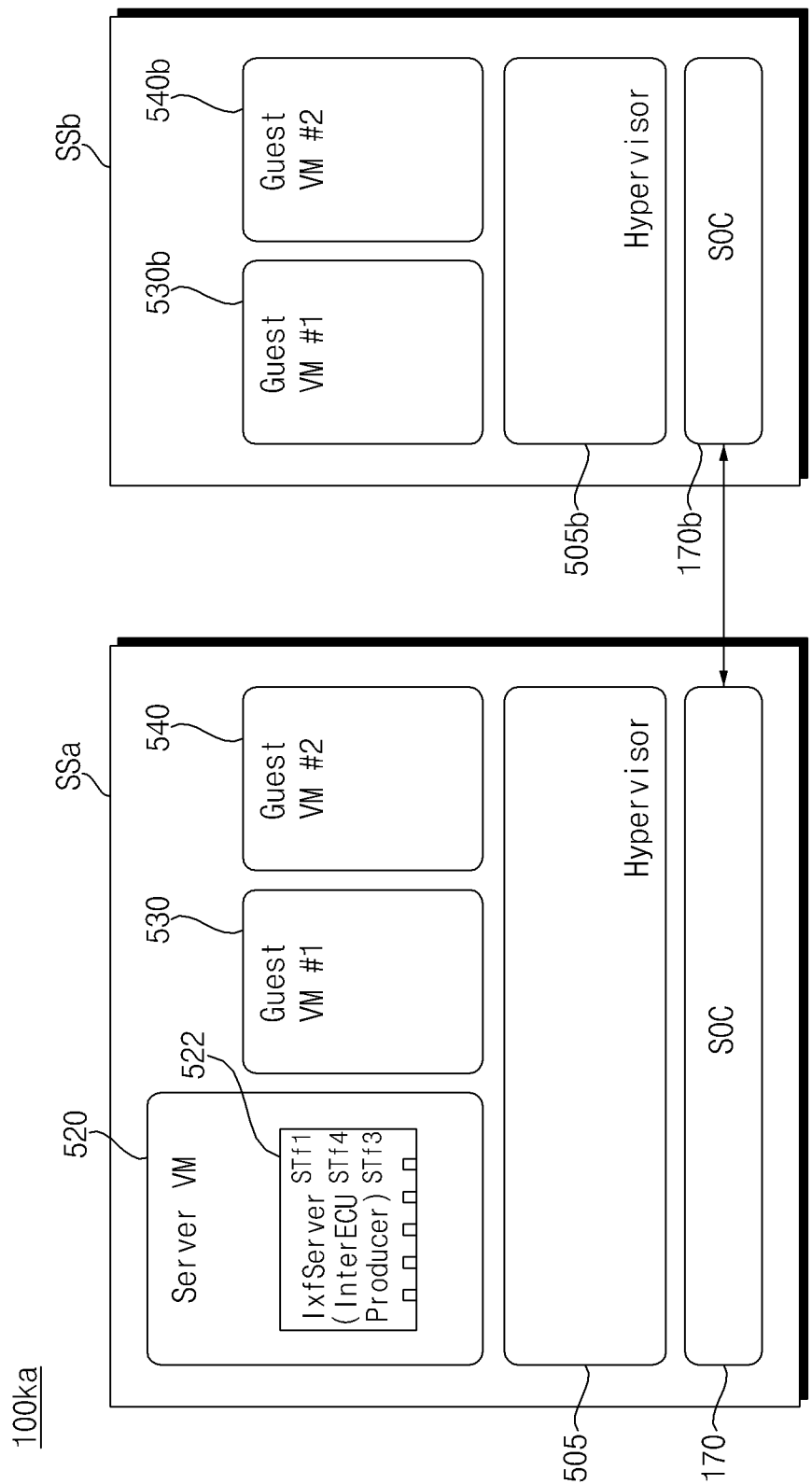

FIG. 9A is a diagram illustrating a vehicle display apparatus according to an embodiment of the present disclosure.

Referring to the drawing, a vehicle display apparatus 100*ka* according to an embodiment of the present disclosure may include a first display 180*a* and a second display 180*b* which are located in a vehicle, the signal processing device 170 configured to perform signal processing for at least one of the first display 180*a* or the second display 180*b*, and the second signal processing device 170*b* configured to perform signal processing.

Meanwhile, the second signal processing device 170*b* in the vehicle display apparatus 100*ka* of FIG. 9A may be the second signal processing device 170*b* corresponding to operation 720 of FIG. 7.

That is, the interface communication may not be supported in the second signal processing device 170*b*.

In addition, the second signal processing device 170*b* may execute only guest virtual machines 530*b* and 540*b*, without executing the server virtual machine.

Accordingly, the signal processing device 170 and the second signal processing device 170*b* may exchange data based on high-speed data bus communication.

That is, the signal processing device 170 and the second signal processing device 170*b* may exchange data based on high-speed data bus communication at a layer below the respective hypervisors 505 and 505*b*, instead of communication at the level of the respective hypervisors 505 and 505*b*.

Meanwhile, the server virtual machine 520 may include a resource manager for resource management and an input and output server interface 522 for data communication with the guest virtual machines.

However, the input and output server interface 522 in the server virtual machine 520 may exchange data with input and output client interfaces 532 and 542 in the first and second guest virtual machines 530 and 540, but is incapable of performing data communication with the second signal processing device 170*b*.

Figure 9B:
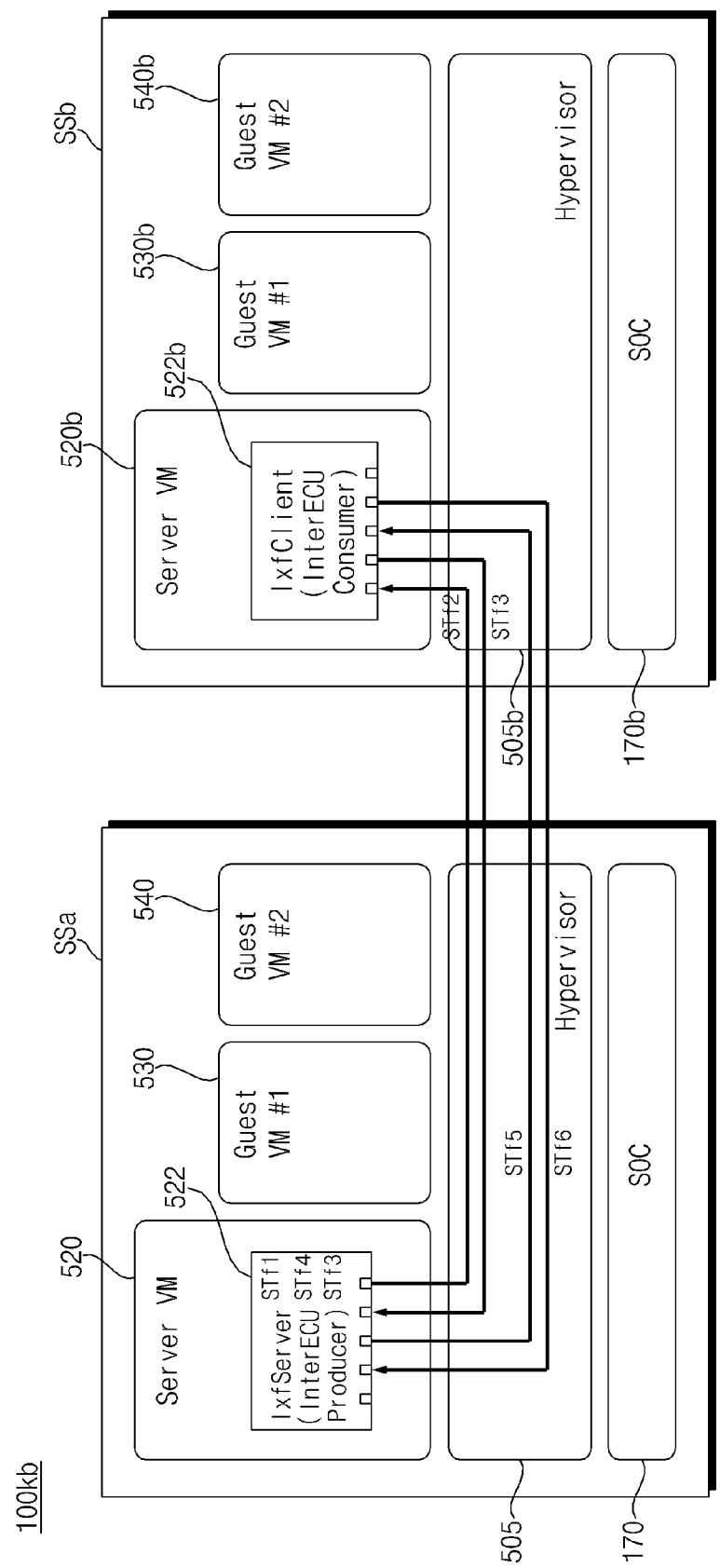

FIG. 9B is a diagram illustrating a vehicle display apparatus according to another embodiment of the present disclosure.

Referring to the drawing, a vehicle display apparatus 100*kb* according to another embodiment of the present disclosure may include a first display 180*a* and a second display 180*b* which are located in a vehicle, a signal processing device 170 configured to perform signal processing for at least one of the first display 180a or the second display 180b, and a second signal processing device 170b configured to perform signal processing.

Meanwhile, the second signal processing device 170b in the vehicle display apparatus 100ka of FIG. 9A may be the second signal processing device 170b corresponding to operation 745 of FIG. 7.

That is, in the second signal processing device 170b, the interface communication may be supported, but the HPC may not be supported.

Accordingly, the second signal processing device 170b may execute the server virtual machine 520b, and may also execute the guest virtual machines 530b and 540b.

Meanwhile, the server virtual machine 520 in the signal processing device 170 may include a resource manager for resource management and the input and output server interface 522 for data communication with the guest virtual machines.

Meanwhile, each of the first and second guest virtual machines 530 and 540 in the signal processing device 170 may include a resource manager for resource management and an input and output client interface (not shown) for data communication with the server virtual machine 520.

Meanwhile, the input and output server interface 522 of the server virtual machine 520 in the signal processing device 170 may exchange data with the input and output client interface (not shown) of the first and second guest virtual machines 530 and 540 in the signal processing device 170, and may exchange data with an input and output server interface 522b of the server virtual machine 520b in the second signal processing device 170b and the input and output client interface (not shown) of the first and second guest virtual machines 530b and 540b in the second signal processing device 170b.

Meanwhile, the signal processing device 170 may include a plurality of processor cores, a cache, a plurality of memories, a position information driver configured to receive or process position information data, a touch driver configured to receive or process touch input data, and a camera driver configured to receive or process camera image data.

Meanwhile, the signal processing device 170 may include a neural network processor NPU for neural network processing, a graphics processor GPU for graphics processing, and a central processor CPU for signal processing.

Meanwhile, the signal processing device 170 may further include a high-speed interface for high-speed data transmission. In this case, the high-speed interface may support PCIe, CCIX, or CXL.

Meanwhile, the second signal processing device 170b may include a plurality of processor cores, a cache, and a plurality of memories.

Meanwhile, the second signal processing device 170b may include a neural network processor NPU for neural network processing, a graphics processor GPU for graphics processing, and a central processor CPU for signal processing.

Meanwhile, the second signal processing device 170b may further include a high-speed interface for high-speed data transmission. In this case, the high-speed interface may support PCIe, CCIX, or CXL.

Meanwhile, if the signal processing device 170 is set as a master device, the server virtual machine 520 in the signal processing device 170 may control the guest virtual machines 530 and 540 in the signal processing device 170, the server virtual machine 520b in the second signal processing device 170, and the guest virtual machines 530b and 540b. Accordingly, the plurality of signal processing devices 170 and 170b for the plurality of displays in the vehicle 200 may efficiently manage resources.

Meanwhile, if the second signal processing device 170b is set as a master device, the server virtual machine 520b in the second signal processing device 170b may control the guest virtual machines 530b and 540b in the second signal processing device 170b, and the server virtual machine 520 and the guest virtual machines 530 and 540 in the signal processing device 170. Accordingly, the plurality of signal processing devices 170 and 170b for the plurality of displays in the vehicle 200 may efficiently manage resources.

Meanwhile, a signal flow in the FIG. 9B is as follows.

After a booting sequence is completed, the server virtual machine 520 in the signal processing device 170 and the second server virtual machine 520b in the second signal processing device 170b execute a benchmark program and store capability scores of the processors 175 and 175b (STf1).

Specifically, it is possible to check capability scores of the server virtual machine 520 and the second server virtual machine 520b.

Then, the server virtual machine 520 in the signal processing device 170 attempts to access the second server virtual machine 520b in the second signal processing device 170b (STf2).

In response to access being accomplished, the second server virtual machine 520b in the second signal processing device 170b transmits resource information, such as a benchmark score, a current usage of CPU/RAM/GPU resources, etc., to the server virtual machine 520 in the signal processing device 170 (STf3).

Subsequently, the server virtual machine 520 in the signal processing device 170 checks the resource information of the second server virtual machine 520b in the second signal processing device 170b, and compares the resource information of the second server virtual machine 520b with the resource information of the signal processing device 170 to determine any one of the signal processing device 170 and the second signal processing device 170b to be a master device (STf4).

Meanwhile, the server virtual machine 520 in the signal processing device 170 may determine a signal processing device, which has lower resource usage, and thus is assigned a higher level, to be a master device based on an available capability score that is inversely proportional to the resource usage.

Figure 10A:
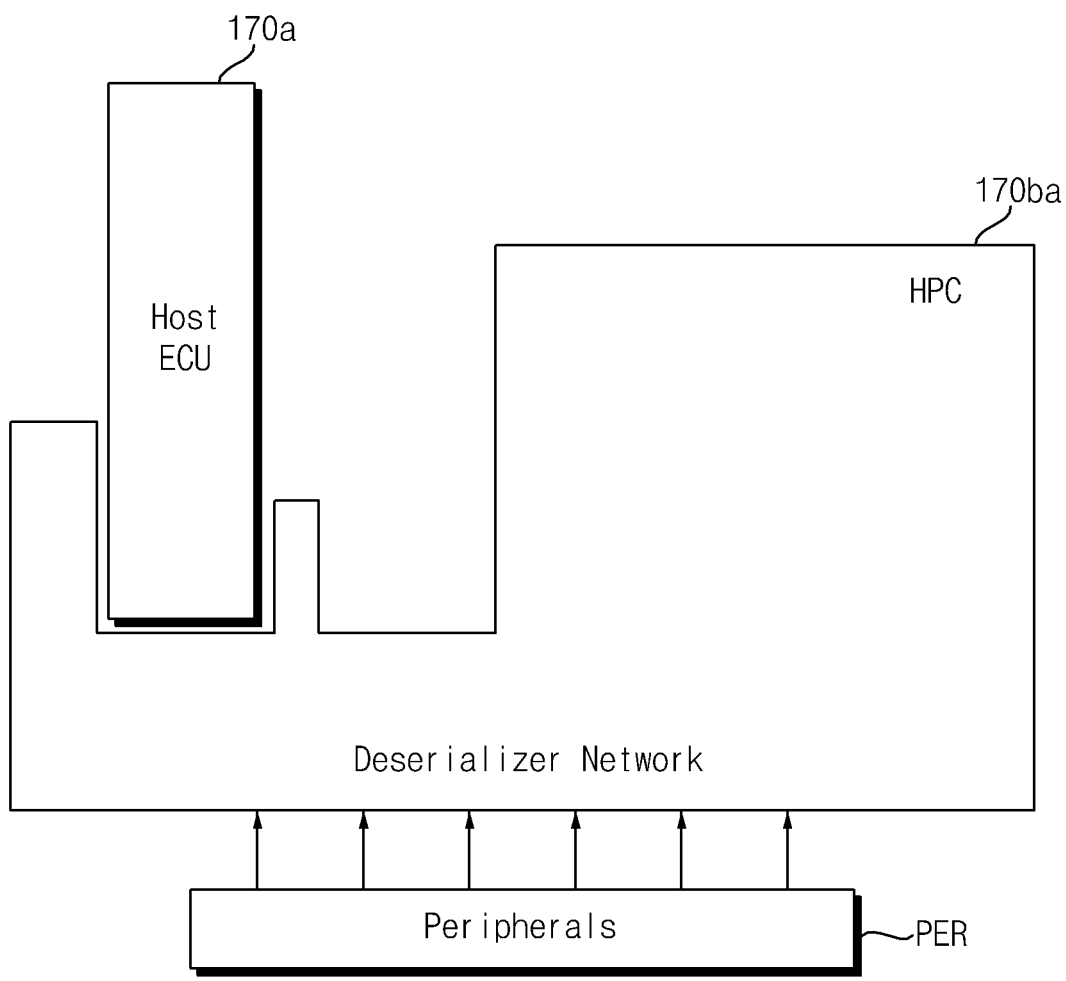

FIG. 10A is a diagram illustrating an example in which HPC is supported in the second signal processing device 170b.

Referring to the drawing, if the HPC is supported in second signal processing device 170b, the signal processing device 170 may determine whether the second signal processing device 170b is of a blade type or a high-speed backbone type, based on hot plugging information of a side-band signal from the second signal processing device 170b.

In the drawing, an example is illustrated in which the second signal processing device 170b in a vehicle display device 100wa is of the blade type. That is, the second signal processing device 170b is of a card type.

Meanwhile, if the second signal processing device 170b is of the blade type, the second signal processing device 170b may receive data from peripherals via a deserializer network.

FIG. 10A is a diagram illustrating another example in which the HPC is supported in second signal processing device 170b.

In the drawing, an example is illustrated in which the second signal processing device 170b in a vehicle display apparatus 100wb is of the high-speed backbone type, i.e., the second signal processing device 170b is of a cable type.

Meanwhile, if the second signal processing device 170b is of the high-speed backbone type, the second signal processing device 170b may exchange data through Ethernet communication or high-speed PCI (PCIe) communication. Accordingly, data exchange between the plurality of signal processing devices 170 and 170b may be performed efficiently.

Meanwhile, the second signal processing device 170b may include a plurality of computing nodes CNa to CNd and the second processor 175b therein.

Figure 11:
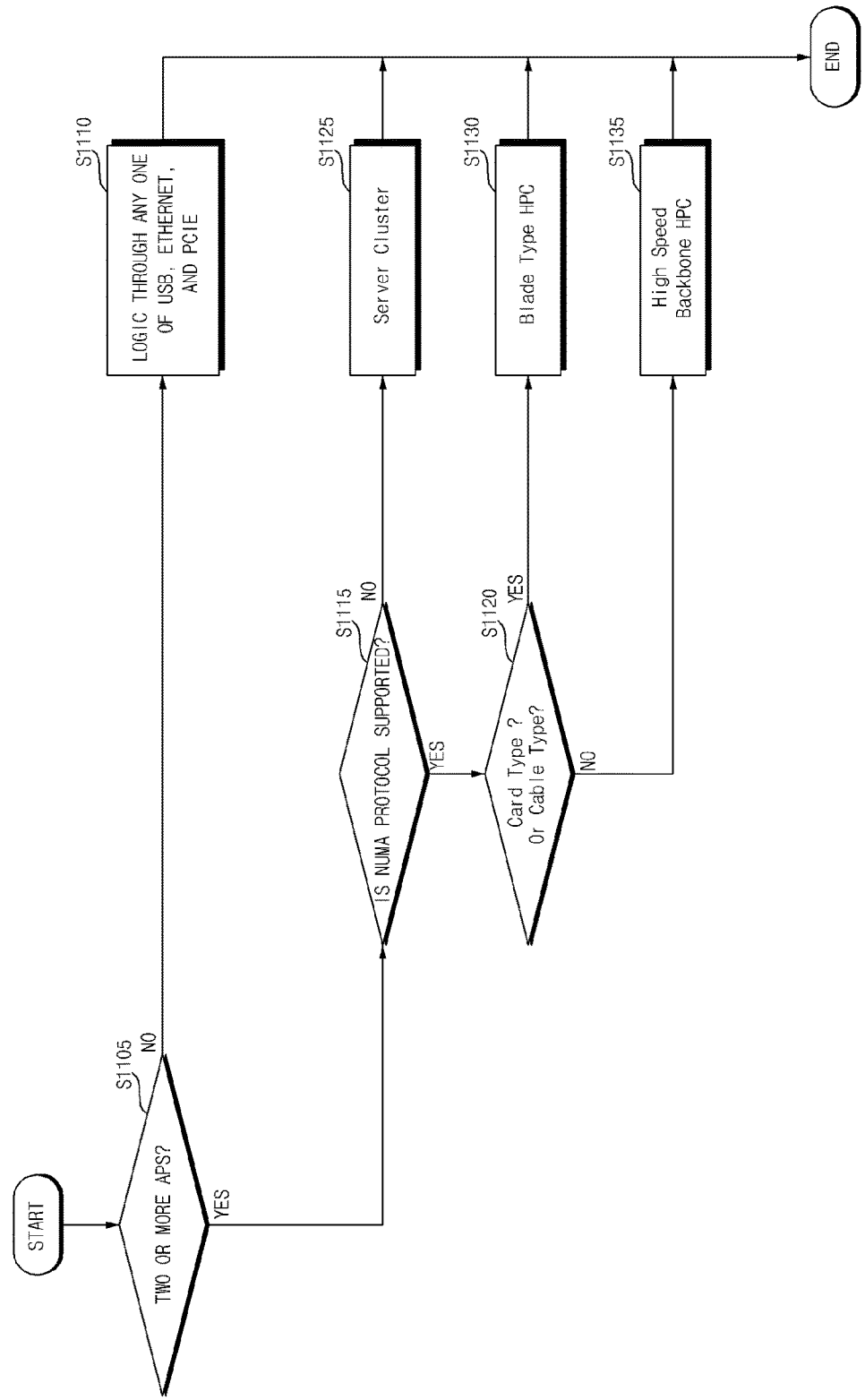
FIG. 11 is a flowchart illustrating another example of an operation method of a vehicle display apparatus according to an embodiment of the present disclosure.

FIG. 11 is a flowchart illustrating another example of an operation method of a vehicle display apparatus according to an embodiment of the present disclosure.

Referring to the drawing, the signal processing device 170 determines whether the second signal processing device 170b includes a plurality of processors (S1105).

For example, the signal processing device 170 determines whether the central processor CPU, the graphics processor GPU, the neural network processor NPU, and the like are included in the second signal processing device 170b.

If the processors are included therein, the signal processing device 170 may perform operation 1115 (S1115).

Meanwhile, if the number of processors included in the second signal processing device 170b is not plural, the signal processing device 170 performs operation 1110 (S1110).

That is, if the number of processors included in the second signal processing device 170b is not plural, the signal processing device 170 may exchange data with the second signal processing device 170b through at least one of USB communication, Ethernet communication, or high-speed PCI communication. Accordingly, data exchange between the plurality of signal processing devices 170 and 170b may be performed efficiently.

Meanwhile, if the number of processors included in the second signal processing device 170b is not plural and the interface communication is not supported, the signal processing device 170 may determine the second signal processing device 170b to be a slave device. Accordingly, data exchange between the plurality of signal processing devices 170 and 170b may be performed efficiently.

Meanwhile, if the number of processors included in the second signal processing device 170b is not plural, the signal processing device 170 may exchange data with the second signal processing device 170b through the interface communication, and may determine the second signal processing device 170b to be a master device or a slave device based on the interface communication. Accordingly, data exchange between the plurality of signal processing devices 170 and 170b may be performed efficiently.

Meanwhile, the determination as to whether the interface communication is supported in operation 710 (S710) may correspond to whether the processors in the second signal processing device 170b are plural in number.

For example, if the number of processors in the second signal processing device 170b is not plural but one, the server virtual machine is not executed, such that the interface communication is not supported in the second signal processing device 170b.

Then, if the processors in the second signal processing device 170b are plural in number, the signal processing device 170 determines whether non-uniform memory access is supported (S1115).

The determination as to whether the non-uniform memory access (NUMA) is supported may correspond to whether a shared memory is supported in the second signal processing device 170b.

That is, if the processors in the second signal processing device 170b are plural in number, the signal processing device 170 may determine whether a shared memory is supported in the second signal processing device 170b.

Meanwhile, if the non-uniform memory access may be supported while the processors in the second signal processing device 170b are plural in number, the signal processing device 170 may determine the second signal processing device 170b to be a master device. Accordingly, data exchange between the plurality of signal processing devices 170 and 170b may be performed efficiently.

Meanwhile, if the non-uniform memory access may be supported while the processors in the second signal processing device 170b are plural in number, the signal processing device 170 may determine whether the second signal processing device 170b is of a blade type or a high-speed backbone type based on hot plugging information of a side-band signal from the second signal processing device 170b (S1120).

For example, if the second signal processing device 170b is of the blade type as illustrated in FIG. 10A, the second signal processing device 170b may receive data via a deserializer network (S1130).

Figure 10B:
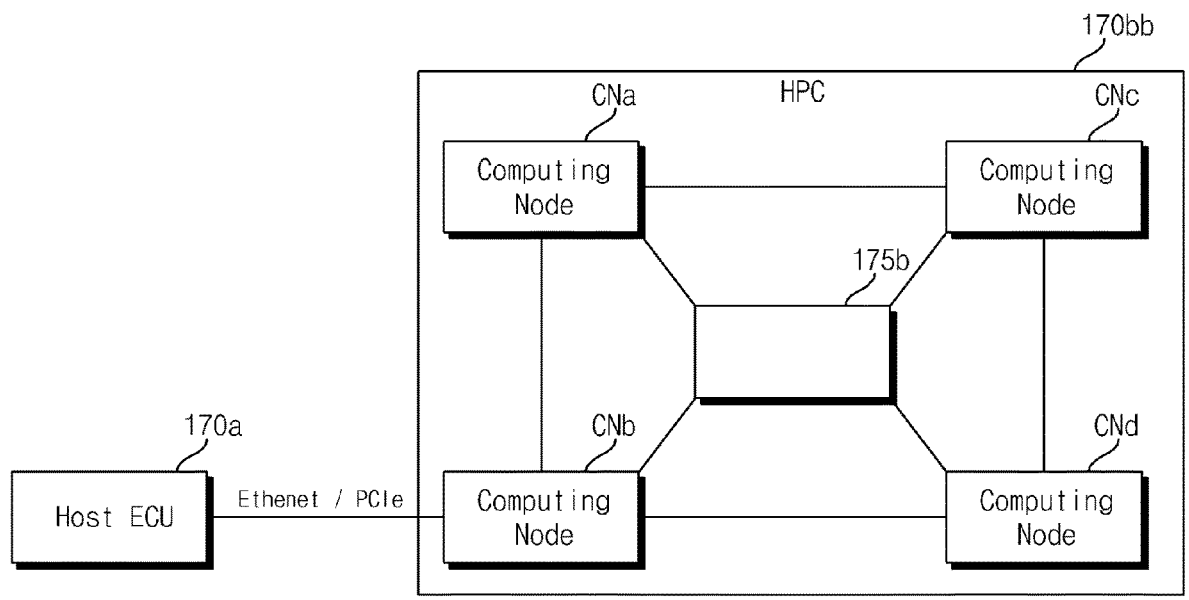

In another example, if the second signal processing device 170b is of the high-speed backbone type as illustrated in FIG. 10B, the second signal processing device 170b may exchange data through Ethernet communication or high-speed PCI (PCIe) communication (S1135).

Meanwhile, if the non-uniform memory access is not supported in operation 1115, the second signal processing device 170b may operate as a server cluster (S1125).

That is, if the non-uniform memory access is not supported while the processors in the second signal processing device 170b are plural in number, the signal processing device 170 may exchange data with the second signal processing device 170b through the interface communication, and may determine the second signal processing device 170b to be a master device or a slave device based on the interface communication. Accordingly, data exchange between the plurality of signal processing devices 170 and 170b may be performed efficiently.

Meanwhile, if the non-uniform memory access is not supported while the processors in the second signal processing device 170b are plural in number, the signal processing device 170 may request resource information of the second signal processing device 170b, may receive the resource information of the second signal processing 170b, and may determine the second signal processing device 170b to be a master device or a slave device based on the received resource information of the second signal processing device 170b. Accordingly, data exchange between the plurality of signal processing devices 170 and 170b may be performed efficiently. Particularly, data exchange may be performed efficiently by determining a master device and a slave device based on the resource information.

Meanwhile, as in operation 1130 (S1130) or operation 1135 (S1135), if the server virtual machine 520b is executed in the second signal processing device 170b and the non-uniform memory access is supported, the signal processing device 170 may determine the second signal processing device 170b to be a master device. Accordingly, data exchange between the plurality of signal processing devices 170 and 170b may be performed efficiently.

Meanwhile, as in operation 1125, if the server virtual machine 520*b* is executed in the second signal processing device 170*b* and the non-uniform memory access is not supported, the signal processing device 170 may exchange data with the second signal processing device 170*b* through the interface communication, and may determine the second signal processing device 170*b* to be a master device or a slave device based on the interface communication. Accordingly, data exchange between the plurality of signal processing devices 170 and 170*b* may be performed efficiently.

Meanwhile, as in operation 1125, if the server virtual machine 520*b* is executed in the second signal processing device 170*b* and the non-uniform memory access is not supported, the signal processing device 170 may request resource information of the second signal processing device 170*b*, may receive the resource information of the second signal processing 170*b*, and may determine the second signal processing device 170*b* to be a master device or a slave device based on the received resource information of the second signal processing device 170*b*. Accordingly, data exchange between the plurality of signal processing devices 170 and 170*b* may be performed efficiently.

FIGS. 12 to 15 are diagrams referred to in the description of FIG. 7.

Figure 12:
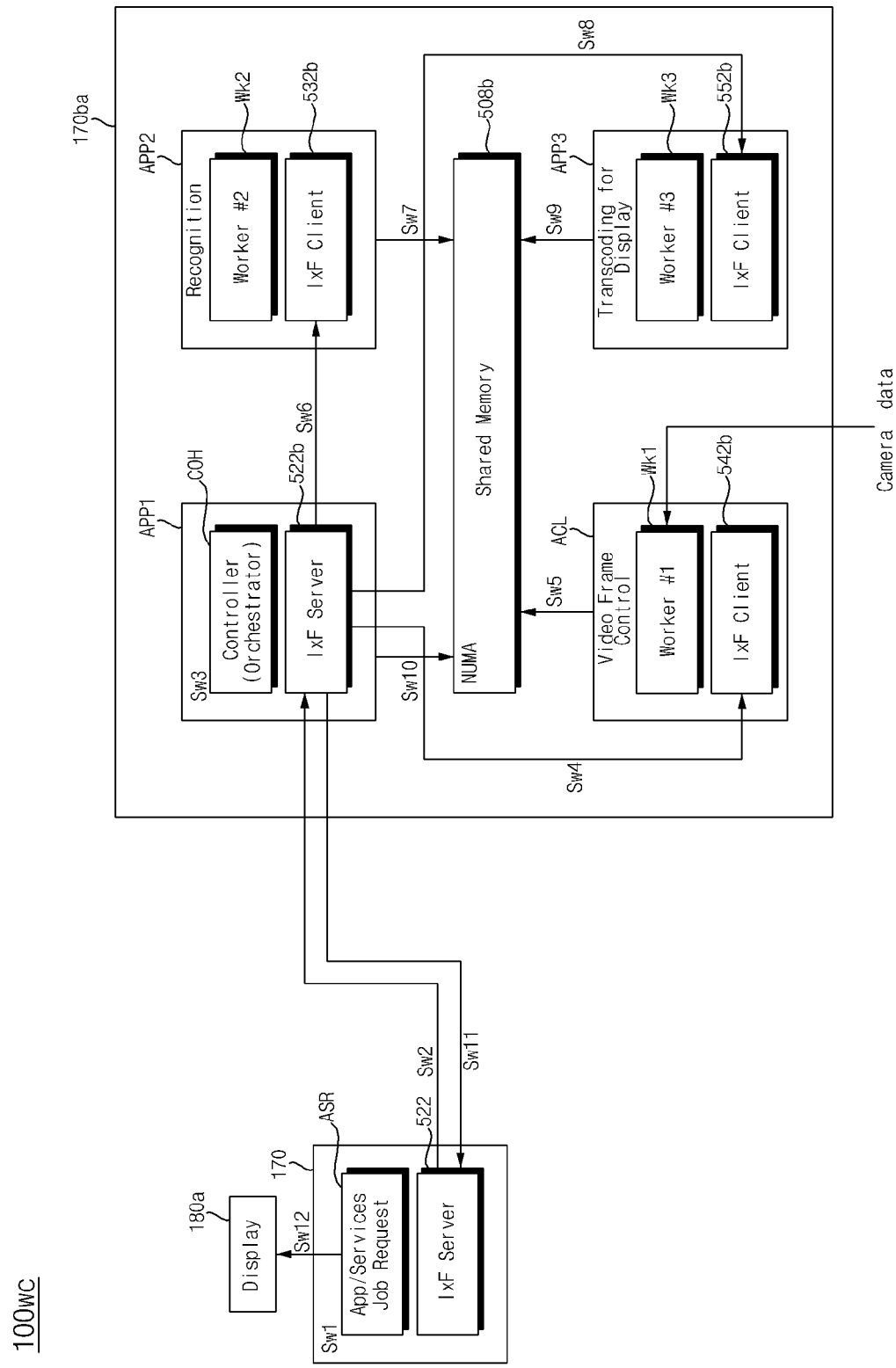
FIGS. 12 to 15 are diagrams referred to in the description of FIG. 7.

First, FIG. 12 is a diagram illustrating a vehicle display apparatus according to yet another embodiment of the present disclosure.

Referring to the drawing, a vehicle display apparatus 100*wc* according to yet another embodiment of the present disclosure may include a first display 180*a* and a second display 180*b* which are located in a vehicle, a signal processing device 170 configured to perform signal processing for at least one of the first display 180*a* or the second display 180*b*, and a second signal processing device 170*b* configured to perform signal processing.

The HPC of the blade type corresponding to FIG. 10A may be supported in the second signal processing device 170*b*.

Accordingly, the second signal processing device 170*b* may be a master device, and the signal processing device 170 may be a slave device.

The signal processing device 170 may control the first display 180*a*.

To this end, the signal processing device 170 may include a server interface 522 and a service job requester ASR.

Meanwhile, the second signal processing device 170*b* may include a plurality of processors APP1 to APP3, an accelerator, and a shared memory 508*b*.

Here, the shared memory 508*b* is capable of non-uniform memory access (NUMA).

Meanwhile, the plurality of processors APP1 to APP3 and the accelerator may respectively correspond to virtual machines.

For example, a first processor APP1 among the plurality of processors APP1 to APP3 may correspond to the server virtual machine 520*b*, and a second processor APP2 and a third processor APP3 among the plurality of processors APP1 to APP3 may correspond to a first guest virtual machine 530*b* and a second guest virtual machine 540*b*, respectively, and the accelerator may correspond to a third guest virtual machine 550*b*.

The first processor APP1 among the plurality of processors APP1 to APP3 may include a controller COH and the server interface 522*b*.

The accelerator, the second processor APP2, and the third processor APP3 may include client interfaces 542*b*, 532*b*, and 552*b* and workers Wk1, Wk2, and Wk3, respectively.

Meanwhile, camera data may be input to the accelerator in the second signal processing device 170*b*, and the accelerator may perform video frame control.

The second processor APP2 and the third processor APP3 may perform recognition and transcoding for display, respectively.

In addition, the first processor APP1 may control the accelerator, the second processor APP2, and the third processor APP3, and may exchange data with the signal processing device 170.

The signal processing device 170 and the second signal processing device 170*b* may operate as follows.

For example, the signal processing device 170, which is a slave device, may request execution of interface communication-based distribution (Sw1).

Then, the server interface 522 in the signal processing device 170 may transmit a job request to the second signal processing device 170*b* (Sw2).

Subsequently, the controller COH of the first processor APP1 in the second signal processing device 170*b* may analyze a job to be performed, find capability of each node to perform the job, and completes job assignment to matching nodes (Sw3).

Next, the first processor APP1 in the second signal processing device 170*b* may request job execution through the client interface 542*b* in the accelerator ACL (Sw4).

For example, the first processor APP1 in the second signal processing device 170*b* may transmit a request for execution of video frame control to the accelerator ACL based on the camera data.

Then, the accelerator ACL may write the camera data, on which video frame control is performed, in the shared memory 508*b* (Sw5).

Subsequently, the first processor APP1 in the second signal processing device 170*b* may transmit a request for job execution to a second worker Wk2 through the client interface 532*b* in the second processor APP2 (Sw6).

For example, the first processor APP1 in the second signal processing device 170*b* may transmit a request for video recognition to the second processor APP2 based on the camera data.

Then, the second processor APP2 may write a result of the video recognition in the shared memory 508*b* (Sw7).

Next, the first processor APP1 in the second signal processing device 170*b* may transmit a request for job execution to a third worker Wk3 through the client interface 552*b* in the third processor APP3 (Sw8).

For example, the first processor APP1 in the second signal processing device 170*b* may transmit a request for transcoding for display to the third processor APP3 based on the camera data.

Then, the third processor APP3 may write a result of the transcoding in the shared memory 508*b* (Sw9).

Subsequently, the controller COH in the first processor APP1 may read a processing result from the shared memory 508*b*, and may transmit data to the signal processing device 170 through the server interface 522*b* (Sw10).

Next, the server interface of the signal processing device 170 may receive data processed by the second signal processing device 170*b* (Sw11).

Then, the service job requester ASR of the signal processing device 170 may control a processing result to be displayed on the first display 180*a* (Sw12). Accordingly, if the second signal processing device 170*b* is capable of High-Performance Computing (HPC), the second signal processing device 170*b* may rapidly process the camera data and display a processing result.

Figure 13:
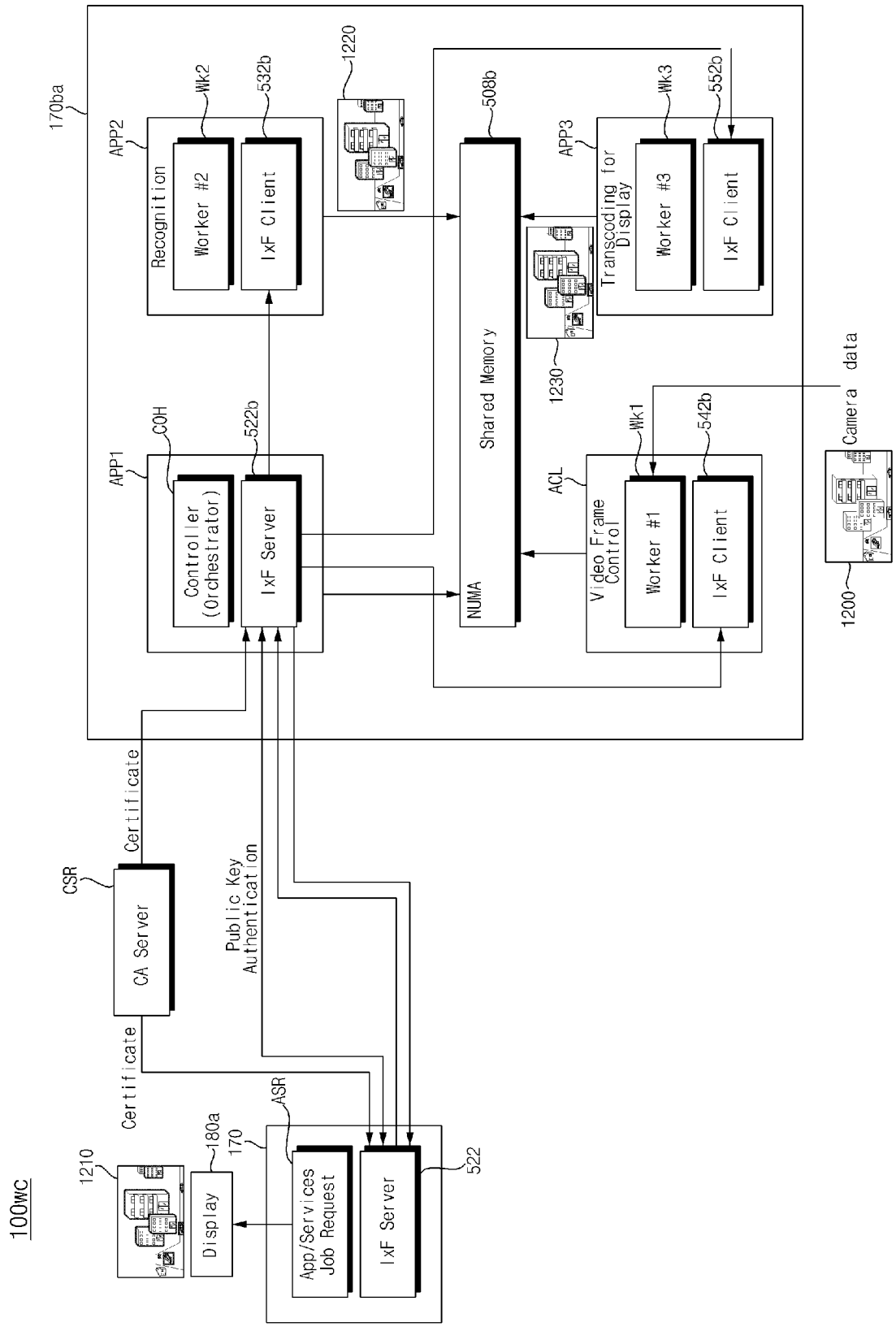

FIG. 13 is a diagram referred to in the description of FIG. 12.

Referring to the drawing, a camera image 1200 from a camera is input to the accelerator ACL in the second signal processing device 170b.

The accelerator ACL may perform video frame control and may write the camera image 1200, on which the video frame control is performed, in the shared memory 508b.

Meanwhile, the second processor APP2 may perform video recognition based on the camera image 1200 written in the shared memory 508 and write a video recognition result image 1220 in the shared memory 508b.

Then, the third processor APP3 may perform transcoding for display on the video recognition result image 1220 written in the shared memory 508b and write a transcoding result image 1230 in the shared memory 508b.

Subsequently, in response to a request of the signal processing device 170, the first processor APP1 may transmit the transcoding result image 1230 to the signal processing device 170.

Meanwhile, before receiving the request of the signal processing device 170, the second signal processing device 170b may perform mutual authentication with the signal processing device 170 by using a public-key method and the like.

For example, if the signal processing device 170 transmits authentication data to a separate authentication server CSR, the authentication server CSR transmits authentication data of the signal processing device 170 to the second signal processing device 170b. Accordingly, mutual authentication may be performed between the signal processing device 170 and the second signal processing device 170b.

Further, the second signal processing device 170b may transmit Public Key Authentication to the signal processing device 170 based on the received authentication data. Accordingly, authentication may be performed.

Meanwhile, after performing mutual authentication with the second signal processing device 170b, the signal processing device 170 may transmit a request for data transmission to the second signal processing device 170b, and in response to the request, the second signal processing device 170b may transmit the transcoding result image 1230 to the signal processing device 170.

Then, the service job requester ASR of the signal processing device 170 may control the first display 180a to display an image 1210 which is based on the transcoding result image 1230 (Sw12). Accordingly, if the second signal processing device 170b is capable of High-Performance Computing (HPC), the second signal processing device 170b may rapidly process an image related to the camera data and display the image with a plus sign (+).

Figure 14A:
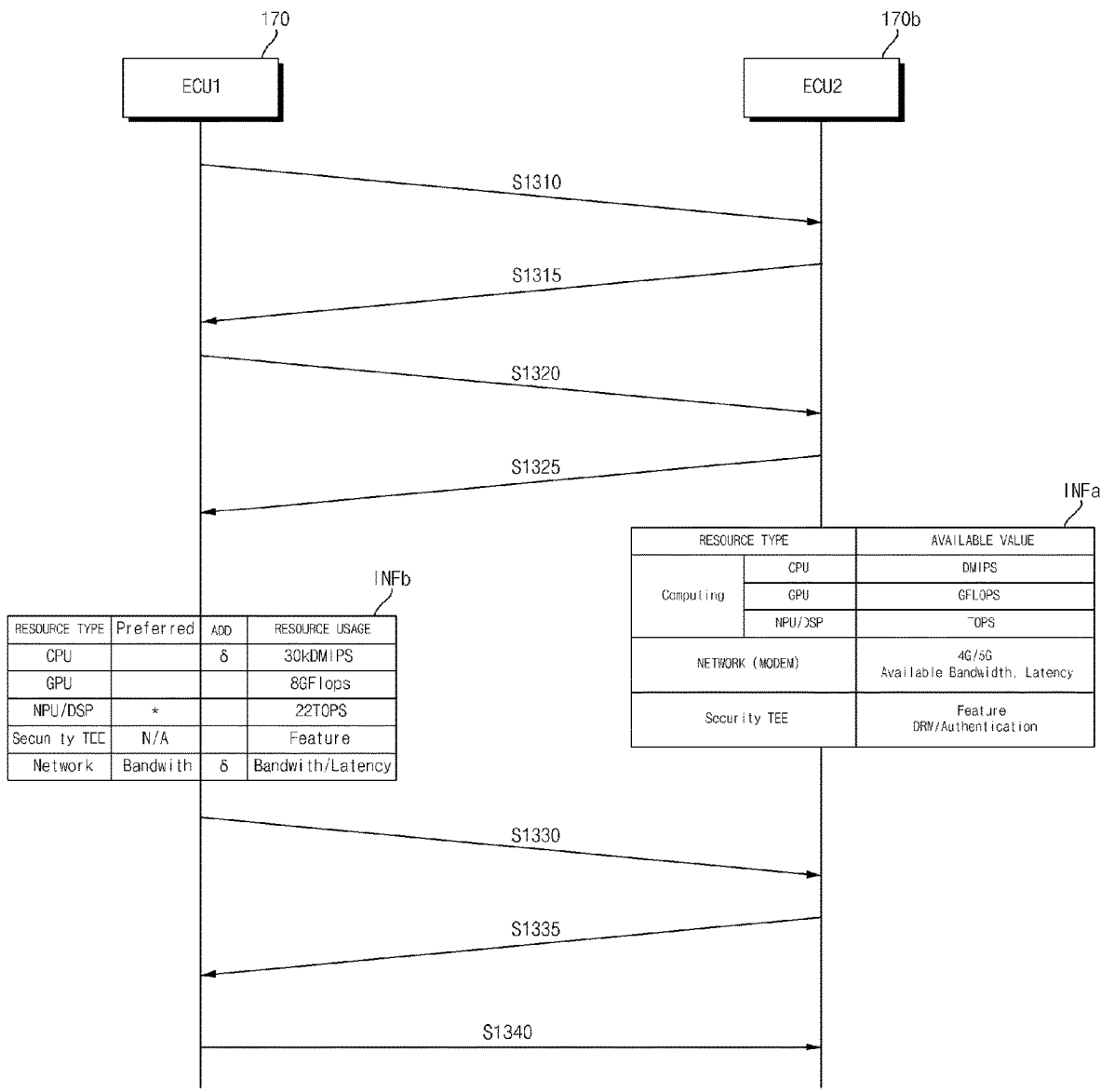
Figure 14B:
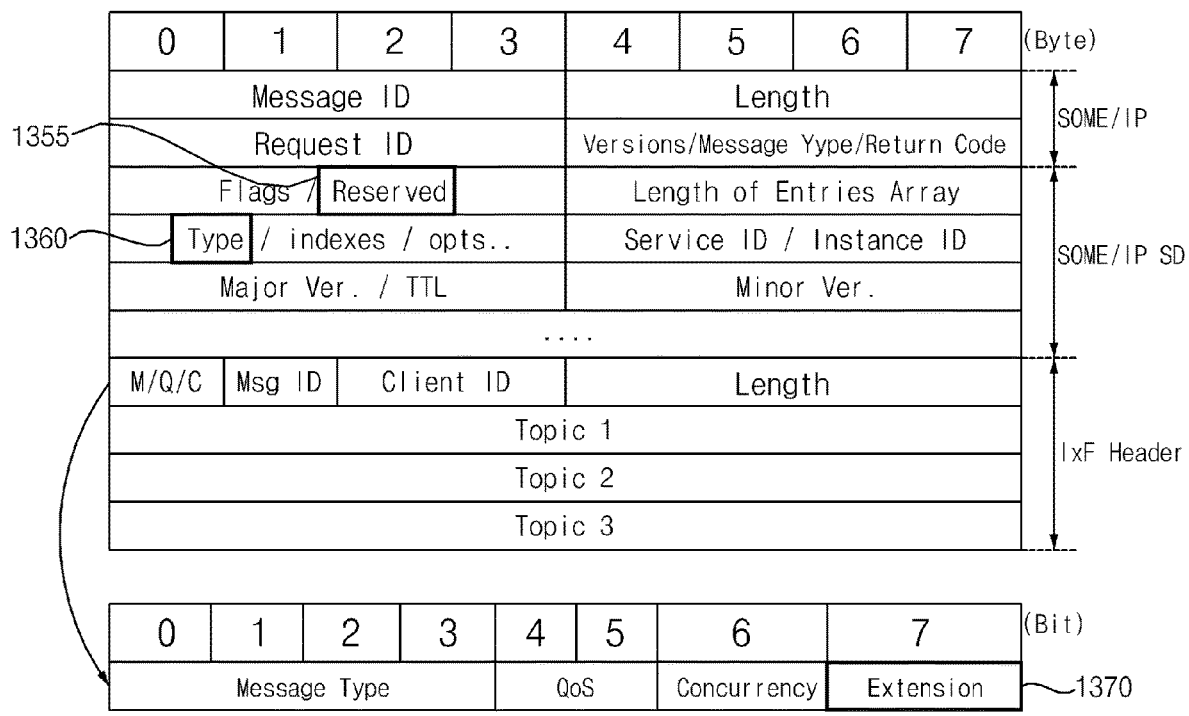

FIG. 14A is an example of a signal flow diagram of a signal processing device and a second signal processing device, and FIG. 14B is a diagram referred to in the description of FIG. 14A.

Referring to the drawings, the signal processing device 170 may transmit a message for server virtual machine discovery to the second signal processing device 170b (S1310).

The second signal processing device 170b receives the message for server virtual machine discovery, and in response to the message, the second signal processing device 170b may transmit a message regarding the discovered server virtual machine (S1315).

Then, the signal processing device 170 may transmit a message for requesting capability information or resource information to the second signal processing device 170b (S1320).

The second signal processing device 170b receives the message for requesting the capability information or resource information, and in response to the message, the second signal processing device 170b may transmit a message including the capability information or resource information INFa (S1325).

In this case, the capability information or resource information may include resource information of the central processor (CPU), resource information of the graphics processor (GPU), resource information of the neural network processor (NPU), network information such as communication and the like, cloud access information, and the like.

Then, the signal processing device 170 may compare capability information or resource information INFb therein with the received capability information or resource information INFa.

Meanwhile, as illustrated herein, the capability information or resource information INFb in the signal processing device 170 may include resource information of the central processor (CPU), resource information of the graphics processor (GPU), resource information of the neural network processor (NPU), network information such as communication and the like, cloud access information, and the like.

Then, the signal processing device 170 may determine a master device and a slave device based on the capability information or resource information INFb in the signal processing device 170 or the received capability information or resource information INFa.

Subsequently, the signal processing device 170 may transmit a message, indicating whether the second signal processing device 170b is a master device or a slave device, to the second signal processing device 170b (S1330).

The second signal processing device 170b receives the message indicating whether the second signal processing device 170b is a master device or a slave device, and in response to the message, the second signal processing device 170b may change a mode to operate as a master device or a slave device (S1335).

Next, the second signal processing device 170b may transmit a message, indicating completion of a mode change, to the signal processing device 170 (S1335).

Then, the signal processing device 170 and the second signal processing device 170b may exchange data in a changed mode, i.e., according to a change in master device and slave device (S1340).

FIG. 14B is a diagram illustrating a message format of each message between operations 1310 to 1340 (S1310 to S1340).

By using reserved information 1355 in the message format, the signal processing device 170 or the second signal processing device 170b may transmit the message for server virtual machine discovery in operation 1310 (S1310), the message regarding the discovered server virtual machine in operation 1315 (S1315), the message for requesting the capability information or resource information in operation 1320 (S1320), the message including the capability information or resource information INFa in operation 1325 (S1325), the message indicating a master device or a slave device in operation 1330 (S1330), and the message indicating completion of a mode change in operation 1335 (S1335).

Meanwhile, by using type information 1360 in the message format, the signal processing device 170 or the second signal processing device 170b may transmit a service search message, a service provision message, a service request message, a service request confirmation message, an event search message, an event publication message, an event driven message, and an event driven approval message.

Meanwhile, the signal processing device 170 or the second signal processing device 170b may transmit a message indicating that only the interface communication is available, or a message indicating that the interface communication and the Scalable service-Oriented MiddlewarE over IP (SOME/IP) are available, by using extension information 1370 in the message format.

Meanwhile, the respective messages between operations 1310 to 1340 (S1310 to S1340) may be transmitted based on the Scalable service-Oriented MiddlewarE over IP (SOME/IP). Accordingly, data exchange between the plurality of signal processing devices 170 and 170b may be performed efficiently.

Figure 15:
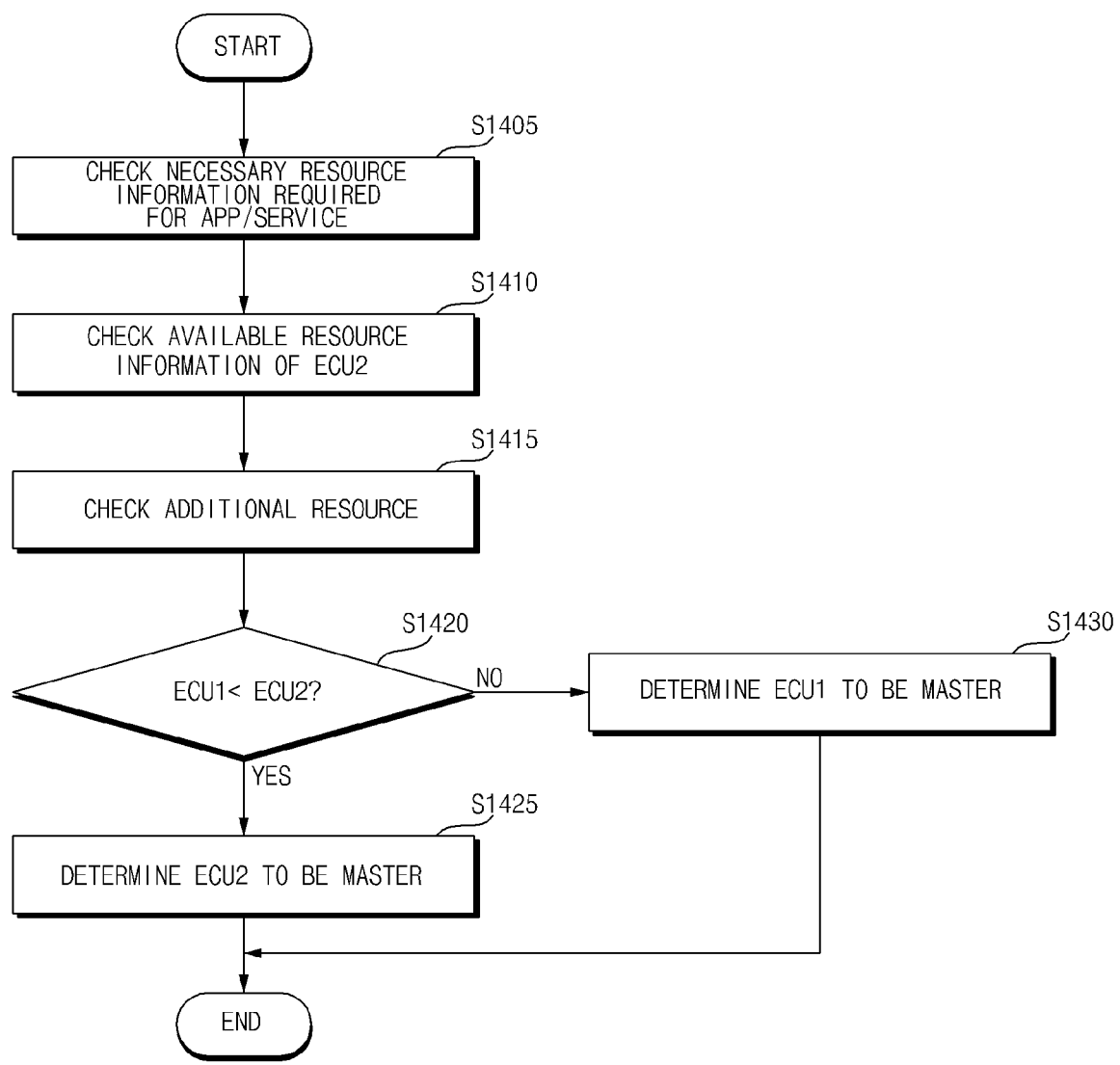

FIG. 15 is a flowchart illustrating an example of determining a master device between a plurality of signal processing devices.

Referring to the drawing, the signal processing device 170 checks necessary resource information required for application to be executed or service (S1405).

Then, the signal processing device 170 checks available resource information of the second signal processing device 170b (S1410).

Subsequently, the signal processing device 170 checks additional resource information of the second signal processing device 170b for the application to be executed or service (S1415).

Then, the signal processing device 170 compares the resource information of the signal processing device 170 with the resource information of the second signal processing device 170b (S1420).

Next, if the second signal processing device 170b has lower resource usage, and thus is assigned a higher level, the signal processing device 170 may determine the second signal processing device 170b to be a master device (S1425).

Alternatively, by comparing the resource information of the signal processing device 170 with the resource information of the second signal processing device 170b, the signal processing device 170 may determine the signal processing device 170, which has lower resource usage, and thus is assigned a higher level, to be a master device (S1430).

If the signal processing device 170 and the second signal processing device 170b have similar available resources, the signal processing device 170 may make determination by further including additional resources for resource sharing and receiving operation results.

If the HPC is supported in the second signal processing device 170b, the signal processing device 170 may compare available resources by including portions for resource sharing and receiving operation results, and may determine a device, which is assigned a higher level, to be a master device.

Meanwhile, in the case of a combined operation, the signal processing device 170 may compare values of items set for a job to be executed, and may determine a device, which is assigned a higher level, to be master device.

Meanwhile, in the case where the signal processing device 170 has a higher level for the central processor CPU, while the second signal processing device 170b has a higher level for the graphics processor GPU and the neural network processor NPU, if a preferred item set for a job to be executed corresponds to the graphics processor GPU, the signal processing device 170 may determine the signal processing device 170 to be a master device in consideration of relevance. Accordingly, data exchange between the plurality of signal processing devices 170 and 170b may be performed efficiently. Particularly, by determining a master device based on a related job, data exchange may be performed efficiently.

Figure 16:
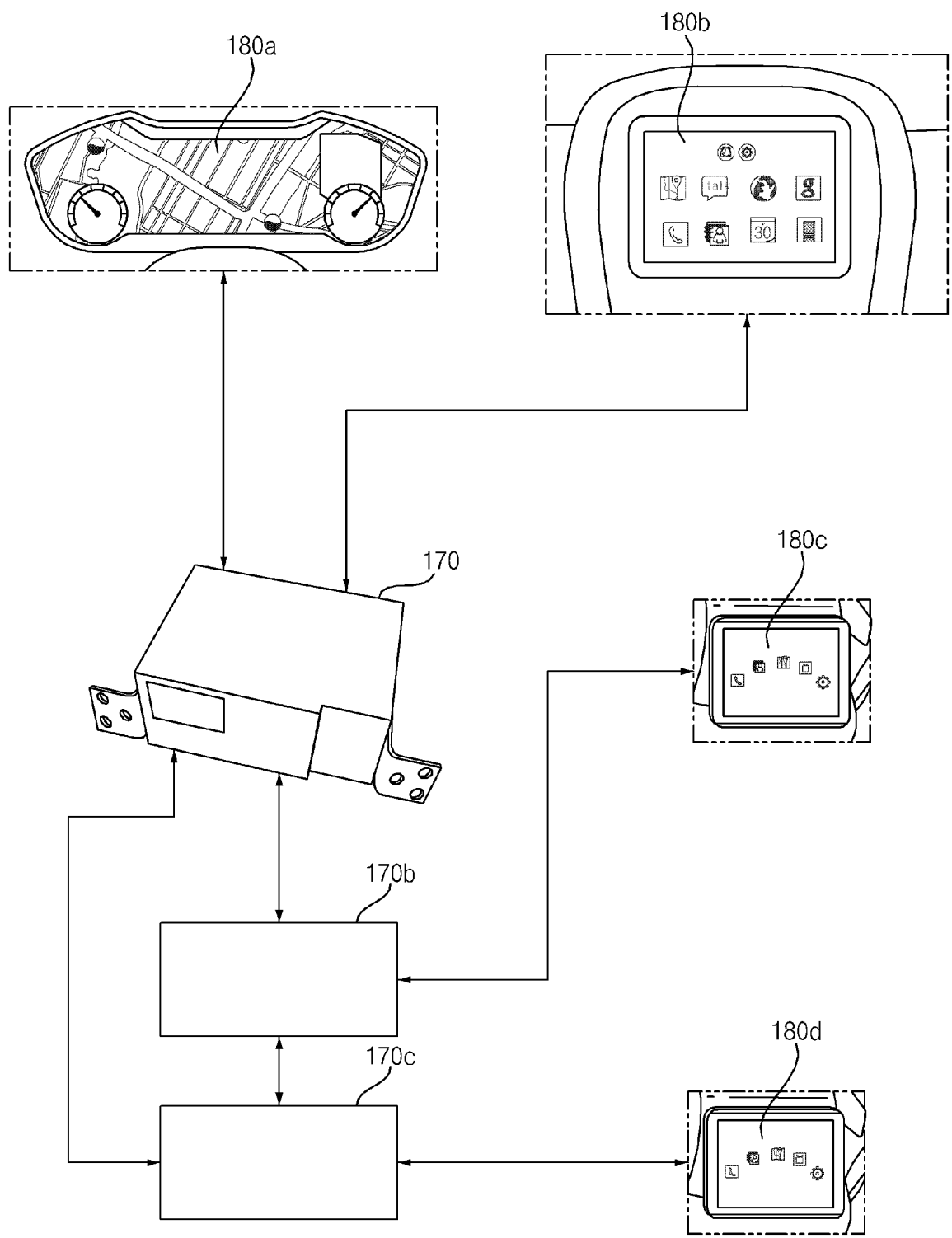
FIG. 16 is a diagram illustrating an external appearance of a vehicle display apparatus according to another embodiment of the present disclosure.

FIG. 16 is a diagram illustrating an external appearance of a vehicle display apparatus according to another embodiment of the present disclosure.

Referring to the drawing, a vehicle display apparatus 100v of FIG. 16 is similar to the vehicle display apparatus 100 of FIG. 2, but is different in that the vehicle display apparatus 100v further includes a third signal processing device 170c. The following description will focus on the third signal processing apparatus 170c.

A vehicle display apparatus 100y of FIG. 16 may include a plurality of displays 180a and 180b, a signal processing device 170 configured to perform signal processing for displaying images, information, and the like on the plurality of displays 180a and 180b, a third display 180c, a second signal processing device 170b configured to perform signal processing for displaying images, information, and the like on the third display 180c, a fourth display 180d, and a third signal processing device 170c configured to perform signal processing for displaying images, information, and the like on the fourth display 180d.

The signal processing device 170, the second signal processing device 170b, and the third signal processing device 170c may be spaced apart from each other.

The signal processing device 170, the second signal processing device 170b, and the third signal processing device 170c may divide and process data even for the displays 180a to 180d operating under various operating systems.

Meanwhile, the signal processing device 170, the second signal processing device 170b, and the third signal processing device 170c may display the same information or the same image in a synchronized manner even on the displays 180a to 180d that operate under various operating systems.

Meanwhile, the signal processing device 170, the second signal processing device 170b, and the third signal processing device 170c may share at least some of data with the first guest virtual machine 530 and the second guest virtual machine 540 for divided processing of data. Accordingly, the plurality of signal processing devices 170, 170b, and 170c for the plurality of displays in a vehicle may divide and process data. In addition, the plurality of signal processing devices 170, 170b, and 170c may efficiently manage resources.

Figure 17:
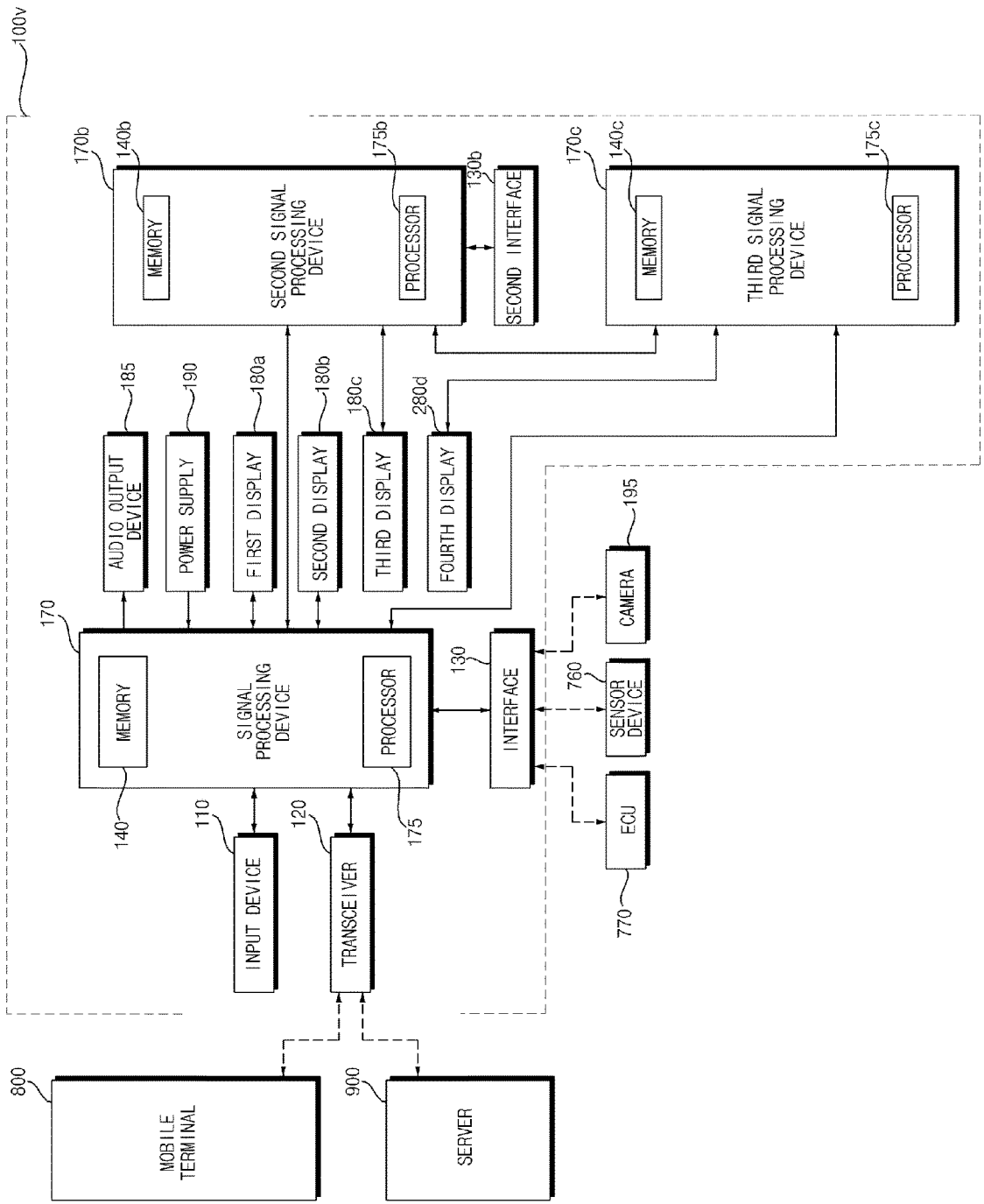
FIGS. 17 and 18 are diagrams referred to in the description of FIG. 16.
Figure 18:
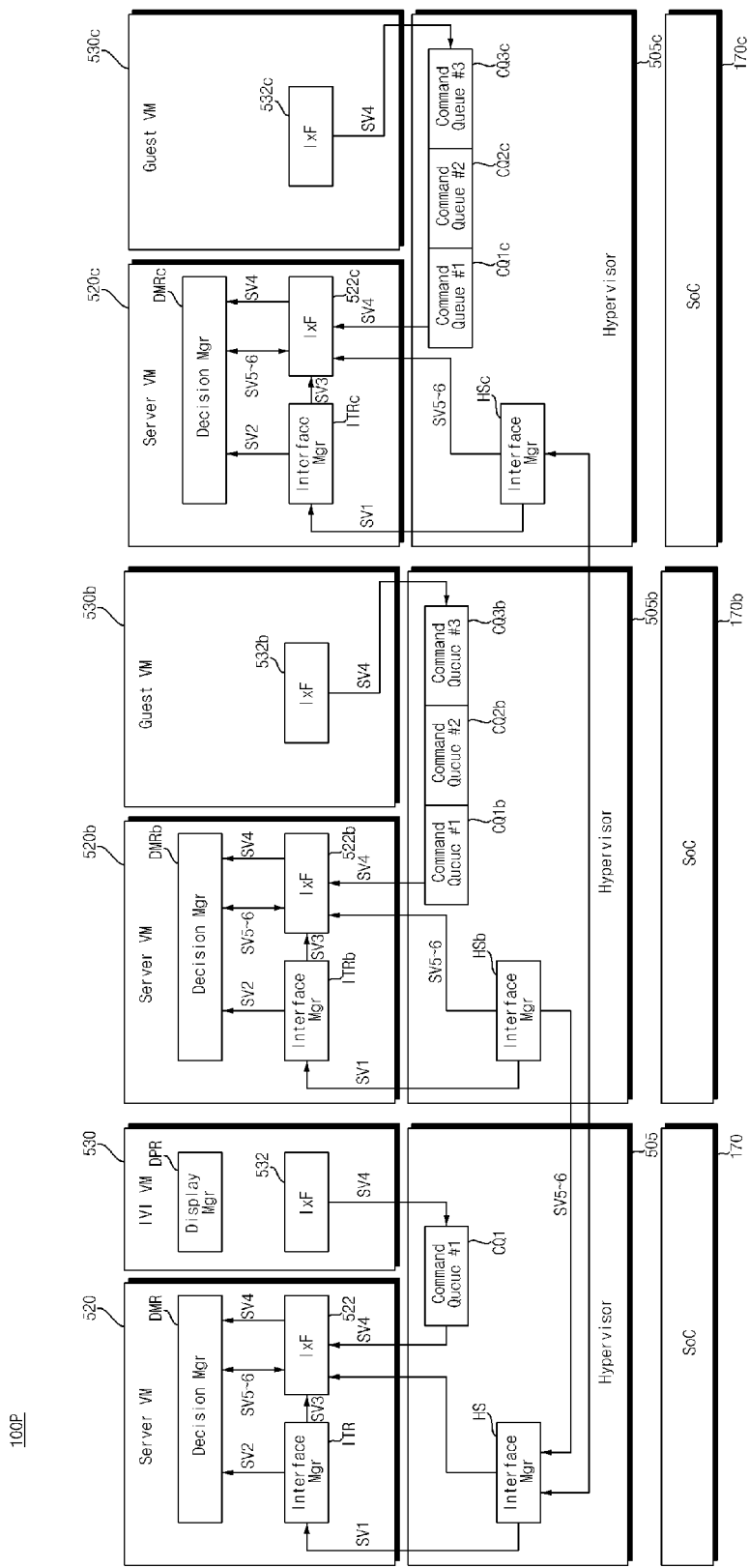

FIGS. 17 and 18 are diagrams referred to in the description of FIG. 16.

FIG. 17 is an example of an internal block diagram of the vehicle display apparatus of FIG. 16.

Referring to the drawing, the internal block diagram of the vehicle display apparatus 100v of FIG. 17 may include an input device 110, a transceiver 120, an interface 130, a second interface 130b, a signal processing device 170, a second signal processing device 170b, a plurality of displays 180a to 180d, an audio output device 185, and a power supply 190, and may further include a third signal processing device 170c.

FIG. 18 is a diagram explaining operation of a vehicle display device 100P including three signal processing devices.

Referring to the drawing, the respective signal processing devices 170, 170b, and 170c execute hypervisors 505, 505b, and 505c, respectively, and execute server virtual machines 520, 520b, and 520c and guest virtual machines 530, 530b, and 530c, respectively, on the respective hypervisors 505, 505b, and 505c.

Meanwhile, interface messengers HS, HSb, and HSc and command queues CQ1, CQ1b, CQ2, CQ3, CQ1c, CQ2c, and CQ3c may be executed within the respective hypervisors 505, 505b, and 505c.

Meanwhile, the respective server virtual machines 520, 520b, and 520c may include decision messengers DMR, DMRb, and DMRc, interface messengers ITR, ITRb, and ITRc, and server interfaces 522, 522b, and 522c.

Meanwhile, the respective guest virtual machines 530, 530b, and 530c may include client interfaces 532, 532b, and 532c.

Meanwhile, among the respective guest virtual machines 530, 530b, and 530c, the guest virtual machine 530 in the signal processing device 170 may further include a display messenger DPR.

An example of operation of the respective signal processing devices 170a, 170b, and 170c is as follows.

The interface messengers HS, HSb, and HSc of the respective signal processing devices 170a, 170b, and 170c may check the presence and status of a network interface to check whether connection with other signal processing devices 170a, 170b, and 170c is ready (Sv1).

Then, after checking that the connection with the other signal processing devices 170a, 170b, and 170c is possible, the interface messengers ITR, ITRb, and ITRc of the respective signal processing devices 170a, 170b, and 170c may check whether the connection is made through an interface, for example, PCIe, USB, Ethernet, etc., and transmit a result to the decision messengers DMR, DMRb, and DMRc (Sv2).

Subsequently, the interface messengers ITR, ITRb, and ITRc checks whether communication is possible through the server interfaces 522, 522b, and 522c, and transmit a result to the decision messengers DMR, DMRb, and DMRc (Sv3).

Then, in order to determine a master device and a slave device, the decision messengers DMR, DMRb, and DMRc obtain resource information or capability information of the respective virtual machines and score the information.

For example, the resource information or capability information obtained from the respective virtual machines may be collected into the server virtual machine 520 of the signal processing device 170 (Sv4).

Next, the decision messenger DMR in the server virtual machine 520 may compare all the resource information or capability information collected from the other signal processing devices 170b and 170c, and based on the comparison, may determine a signal processing device, having a highest level, to be a master device and the remaining devices to be slave devices (Sv5).

Then, the signal processing device 170 transmits information about the determined master device and information about the determined slave devices to the respective signal processing devices 170b and 170c (Sv6).

Subsequently, the respective signal processing devices 170a, 170b, and 170c operate according to their functions based on the determination of the master device and slave devices. Accordingly, data exchange between the plurality of signal processing devices 170, 170b, and 170c may be performed efficiently.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A vehicle display apparatus comprising:
   a first display and a second display mounted in a vehicle:
   a signal processing device configured to perform signal processing for at least one of the first display or the second display; and
   a second signal processing device configured to perform signal processing,
   wherein the signal processing device is configured to determine whether the second signal processing device is a master device or a slave device, based on number information of processors in the second signal processing device and information on support of non-uniform memory access.

2. The vehicle display apparatus of claim 1, wherein in response to the non-uniform memory access being supported while the processors in the second signal processing device are plural in number, the signal processing device is configured to determine the second signal processing device to be a master device.

3. The vehicle display apparatus of claim 2, wherein the signal processing device is configured to determine whether the second signal processing device is of a blade type or a high-speed backbone type, based on hot plugging information of a side-band signal from the second signal processing device.

4. The vehicle display apparatus of claim 3, wherein in response to the second signal processing device being of the blade type, the second signal processing device is configured to receive data via a deserializer network.

5. The vehicle display apparatus of claim 3, wherein in response to the second signal processing device being the high-speed backbone type, the signal processing device is configured to exchange data through Ethernet communication or high-speed PCI communication.

6. The vehicle display apparatus of claim 1, wherein in response to the non-uniform memory access not being supported while the processors in the second signal processing device are plural in number, the signal processing device is configured to exchange data with the second signal processing device through interface communication, and to determine the second signal processing device to be a master device or a slave device based on the interface communication.

7. The vehicle display apparatus of claim 1, wherein in response to the non-uniform memory access not being supported while the processors in the second signal processing device are plural in number, the signal processing device is configured to request resource information of the second signal processing device, to receive the resource information of the second signal processing device, and to determine the second signal processing device to be a master device or a slave device based on the received resource information of the second signal processing device.

8. The vehicle display apparatus of claim 7, wherein the resource information of the second signal processing device is received via Scalable service-Oriented MiddlewarE over IP (SOME/IP) communication.

9. The vehicle display apparatus of claim 8, wherein the signal processing device is configured to further receive extension information and type information of the second signal processing device via the SOME/IP communication.

10. The vehicle display apparatus of claim 1, wherein in response to the processors in the second signal processing device not being plural in number, the signal processing device is configured to exchange data with the second signal processing device through interface communication, and to determine the second signal processing device to be a master device or a slave device based on the interface communication.

11. The vehicle display apparatus of claim 1, wherein in response to the processors in the second signal processing device not being plural in number, the signal processing device is configured to exchange data through at least one of USB communication, Ethernet communication, or high-speed PCI communication.

12. The vehicle display apparatus of claim 1, wherein in response to the processors in the second signal processing device not being plural in number and the interface communication not being supported, the signal processing device is configured to determine the second signal processing device to be a slave device.

13. The vehicle display apparatus of claim 1, wherein in response to a server virtual machine not being supported in the second signal processing device, the signal processing device is configured to determine the second signal processing device to be a slave device.

14. The vehicle display apparatus of claim 1, wherein in response to a server virtual machine being executed in the second signal processing device and the non-uniform memory access being supported, the signal processing device is configured to determine the second signal processing device to be a master device.

15. The vehicle display apparatus of claim 1, wherein in response to a server virtual machine being executed in the second signal processing device and the non-uniform memory access not being supported, the signal processing device is configured to exchange data with the second signal processing device through interface communication, and to determine the second signal processing device to be a master device or a slave device based on the interface communication.

16. The vehicle display apparatus of claim 1, wherein in response to a server virtual machine being executed in the second signal processing device and the non-uniform memory access not being supported, the signal processing device is configured to request resource information of the second signal processing device, to receive the resource information of the second signal processing device, and to determine the second signal processing device to be a master device or a slave device based on the received resource information of the second signal processing device.

17. A vehicle display apparatus comprising:
a first display and a second display mounted in a vehicle:
a signal processing device configured to perform signal processing for at least one of the first display or the second display; and
a second signal processing device configured to perform signal processing,
wherein the signal processing device is configured to determine whether the second signal processing device is a master device or a slave device, based on information as to whether a server virtual machine is executed in the second signal processing device and information on support of non-uniform memory access.

18. The vehicle display apparatus of claim 17, wherein:
in response to a server virtual machine not being supported in the second signal processing device, the signal processing device is configured to determine the second signal processing device to be a slave device; and
in response to a server virtual machine being executed in the second signal processing device and the non-uniform memory access being supported, the signal processing device is configured to determine the second signal processing device to be a master device.

19. The vehicle display apparatus of claim 17, wherein in response to a server virtual machine being executed in the second signal processing device and the non-uniform memory access not being supported, the signal processing device is configured to exchange data with the second signal processing device through interface communication, and to determine the second signal processing device to be a master device or a slave device based on the interface communication.

20. The vehicle display apparatus of claim 17, wherein in response to a server virtual machine being executed in the second signal processing device and the non-uniform memory access not being supported, the signal processing device is configured to request resource information of the second signal processing device, to receive the resource information of the second signal processing device, and to determine the second signal processing device to be a master device or a slave device based on the received resource information of the second signal processing device.

* * * * *